United States Patent [19]

Nakazaki et al.

[11] Patent Number: 5,684,254
[45] Date of Patent: Nov. 4, 1997

[54] LOAD MEASURING DEVICE FOR A VEHICLE

[75] Inventors: Yoji Nakazaki; Hideyuki Aoshima; Naoya Takahashi, all of Shizuoka; Yutaka Atagi; Yoshitaka Yasuda, both of Kanagawa, all of Japan

[73] Assignees: Yazaki Corporation; Isuzu Motors Limited, both of Tokyo, Japan

[21] Appl. No.: 644,191

[22] Filed: May 10, 1996

Related U.S. Application Data

[60] Division of Ser. No. 213,727, Mar. 16, 1994, which is a continuation-in-part of Ser. No. 70,197, Jun. 2, 1993, abandoned.

[30] Foreign Application Priority Data

| | | | |
|---|---|---|---|
| Jun. 9, 1992 | [JP] | Japan | 4-39317 |
| Jun. 9, 1992 | [JP] | Japan | 4-39318 |
| Mar. 16, 1993 | [JP] | Japan | 5-11526 |
| Mar. 16, 1993 | [JP] | Japan | 5-11527 |
| Mar. 16, 1993 | [JP] | Japan | 5-11528 |
| Feb. 25, 1994 | [JP] | Japan | 6-28037 |

[51] Int. Cl.⁶ ............................ G01G 19/12
[52] U.S. Cl. ............ 73/774; 73/768; 73/781; 73/855; 73/862.631
[58] Field of Search ............ 73/862.044, 862.045, 73/862.335, 862.338, 862.474, 862.627, 862.632, 774, 779, 768, 781, 855, 862.631; 177/136, 137, 138

[56] References Cited

U.S. PATENT DOCUMENTS

| | | |
|---|---|---|
| 1,620,442 | 3/1927 | Cobb . |
| 3,172,492 | 3/1965 | Sobotka et al. . |
| 3,241,626 | 3/1966 | Woodburn . |
| 3,350,926 | 11/1967 | Webb ............................ 73/88.5 |
| 3,620,074 | 11/1971 | Laimins et al. . |
| 3,661,220 | 5/1972 | Harris . |
| 3,743,041 | 7/1973 | Videon . |
| 3,935,915 | 2/1976 | Seilly et al. . |
| 4,020,911 | 5/1977 | English et al. . |

(List continued on next page.)

FOREIGN PATENT DOCUMENTS

| | | |
|---|---|---|
| 2025200 | 2/1971 | Germany . |
| 2501078 | 7/1975 | Germany . |
| 3303469 | 10/1983 | Germany . |
| 8529994 | 1/1986 | Germany . |
| 3502008 | 7/1986 | Germany . |
| 3515126 | 10/1986 | Germany . |
| 3630749 | 3/1988 | Germany . |
| 3843869 | 6/1990 | Germany . |
| 315967 | 3/1991 | Japan . |
| 1252413 | 11/1971 | United Kingdom . |
| 1310889 | 3/1973 | United Kingdom . |
| 2178180 | 2/1987 | United Kingdom . |

*Primary Examiner*—George M. Dombroske
*Assistant Examiner*—Eric S. McCall
*Attorney, Agent, or Firm*—Sughrue, Mion, Zinn, Macpeak & Seas, PLLC

[57] ABSTRACT

A vehicle load measuring device includes a sensing element for detecting a strain to measure the load of a vehicle, in which the sensing element is formed in a pin shape, and a device for supporting a suspension of the vehicle, in which a hole is formed in the supporting device and the sensing element is fitted into the hole, wherein the load of the vehicle is measured based on the strain detected by the sensing element produced in response to the load supported by the supporting device, and a positioning groove being formed on a surface of the device for supporting a suspension, wherein when the device for supporting a suspension connects a suspension with a bracket on the vehicle the device for supporting a suspension is positioned by use of the positioning groove, thereby determining the direction of the load to be applied to the sensing element and preventing the device for supporting a suspension from moving in a predetermined direction with respect to the bracket. The supporting device can be a trunnion shaft or a shackle pin. Also, the sensing element includes a magnetic strain sensing element formed from a magnetic material in a plate-like shape having a plurality of holes and having a coil wound in an intersecting manner through the plurality of holes.

10 Claims, 19 Drawing Sheets

U.S. PATENT DOCUMENTS

| | | | |
|---|---|---|---|
| 4,148,369 | 4/1979 | Mercer, Jr. | 73/781 |
| 4,215,754 | 8/1980 | Hagedorn et al. | |
| 4,576,053 | 3/1986 | Hatamura | 73/862.66 |
| 4,782,706 | 11/1988 | Kister et al. | |
| 4,858,475 | 8/1989 | Joacobson et al. | 73/862.54 |
| 4,884,644 | 12/1989 | Reichow. | |
| 4,920,806 | 5/1990 | Obama et al. | |
| 5,032,821 | 7/1991 | Domanico et al. | |
| 5,186,042 | 2/1993 | Miyazaki | 73/118.1 |
| 5,190,116 | 3/1993 | Reichow. | |
| 5,456,119 | 10/1995 | Nakazaki et al. | 73/781 |

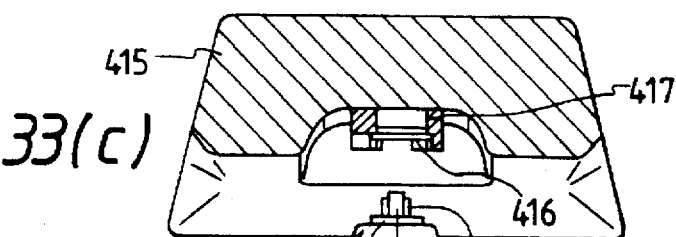
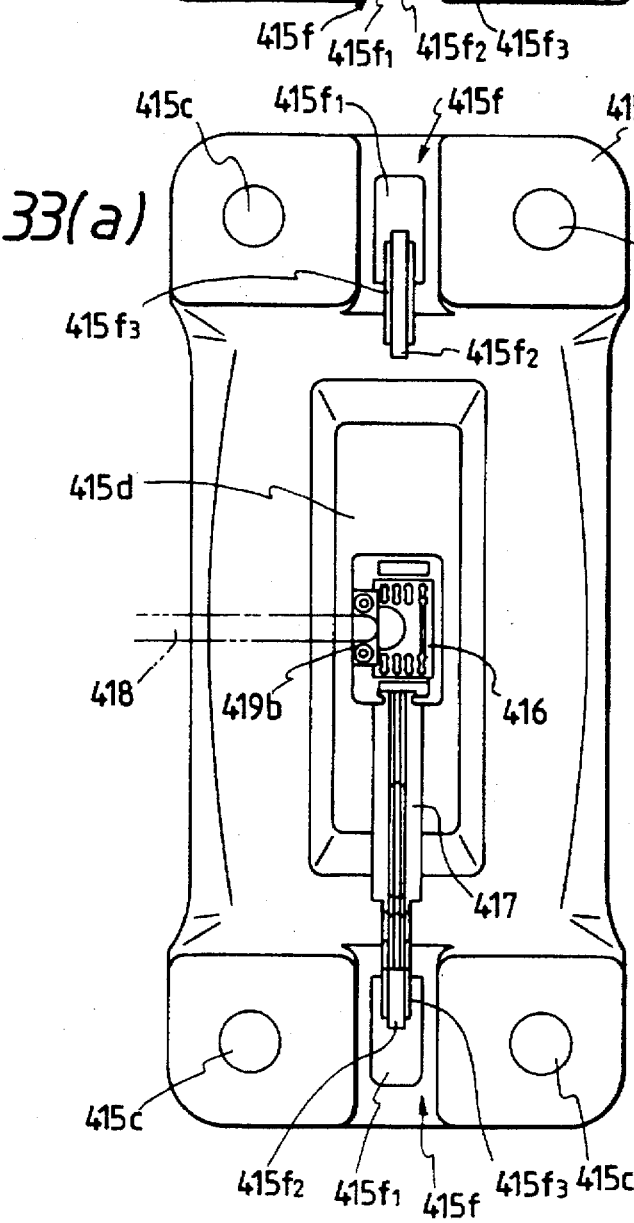
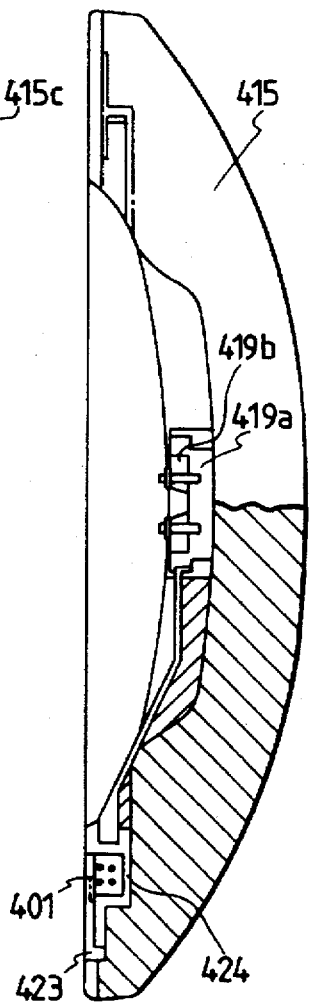

LOAD MEASURING DEVICE FOR A VEHICLE

This is a divisional of application Ser. No. 08/213,727 allowed filed Mar. 16, 1994, which is a continuation-in-part of application Ser. No. 08/070,197 abandoned filed Jun. 2, 1993.

BACKGROUND OF THE INVENTION

This a Continuation-in-Part Application of pending prior application Ser. No. 08/070,197 abandoned filed on Feb. 6, 1993 of Yoji Nakazaki, Yutaka Atagi and Yoshitaka Yasuda entitled to LOAD MEASURING DEVICE FOR VEHICLE.

1. Field of the Invention

The invention relates to a load measuring device for a vehicle, and more particularly, an improvement of a disposition of a strain gauge type sensor or the like used in the load measurement of a vehicle.

2. Prior Art

Conventionally, the load measurement is conducted mainly on a large vehicle such as a truck. An overload of a vehicle such as a truck causes problems in that the maneuverability of the vehicle is lowered to bring about a traffic accident, and that the vehicle and roads are damaged. The load measurement is conducted in order to prevent these problems from arising. The load measurement of a vehicle is generally done using a load measuring device installed on the road in the following manner. A wheel of the vehicle is placed on a loading plate having a load sensor, and the wheel load of the wheel or the axle load is measured. The measured wheel loads and the like are added to each other to obtain the vehicle weight. Then the weights of the driver and the vehicle itself are subtracted from the vehicle weight to obtain the loadage.

Since such a load measuring device is bulky and the cost of its installation is high, however, the number of installation places and that of installed devices are very small. Therefore, only a portion of the whole number of vehicles can be subjected to the load measurement. As a result, the overload of vehicles cannot be sufficiently prevented. In order to solve the problem of the prior art, there is a countermeasure in which, as shown in FIG. 11, a strain gauge type sensor (sensing element) 63 is fixedly interposed between an axle case (axle) 61 and a leaf spring 62 and the strain is measured on the basis of the load applied to the sensor 63, thereby enabling the loadage of each vehicle to be measured.

When rear wheels are arranged in tandem in, for example, a large vehicle, two axle cases are juxtaposed in tandem. As shown in FIG. 12, therefore, a leaf spring 72 is fixed at its center portion to the body by a mounting bracket 73. The ends of the leaf spring 72 are positioned above axle cases 74 and 75, respectively. The curvature of the leaf spring 72 changes depending on the loadage so as to change the relative distance between the axle cases 74 and 75. Therefore, hemisphere slide plates 76 and 77 are disposed on the upper faces of the axle cases 74 and 75, respectively, so that the end portions of the leaf spring 72 can slide over the faces of the slide plates 76 and 77.

In this case, sensors 78 and 79 are fixed to the upper faces of the axle cases 74 and 75, and the slide plates 76 and 77 are secured onto the sensors, respectively. This configuration prevents the sensors 78 and 79 from being subjected to the lateral load which is generated by the leaf spring 72 curved by a change in loadage, thereby allowing an accurate detection value to be obtained. FIG. 13 is an enlarged view of a portion of FIG. 12.

When a strain gauge type sensor is disposed on the upper face of an axle case as described above so that a leaf spring is supported by the upper face of the strain gauge type sensor, the loading surface altitude is increased by the height of the strain gauge type sensor. This increased loading surface altitude impairs ability of a worker to load and unload cargo on a truck.

On the other hand, in order to overcome such a problem, a so-called load meter which measures the loadage of a respective vehicle has been devised. As shown in FIG. 14, for example, in such a load meter, a sensing element 112 of a strain gauge type sensor is attached to the upper face of an axle case 110 of a vehicle, and the sensing element 112 detects a bending strain generated in the axle case 110 to which a load of a rear bod body 113 is applied through leaf springs 114. Even when a loadage is kept constant, however, the detection value may vary depending on the conditions in which the vehicle is positioned, or a change with the passage of time. Therefore, such a load meter has a problem in that its reliability is low.

Examples of cases where the detection value may vary include a case where, as shown in FIG. 15(a), the road surface is irregular and one of the tires runs on a projection, and a case where, as shown in FIGS. 15(b) and 15(c), the road surface is inclined to tilt a vehicle in such a manner that the position of a fulcrum of a load applied to an axle case is varied. In either case, since the vector direction of the weight applied to the axle case varies an usual case, the strain is generated in the axle case in a inconsistent manner, resulting in that the detection value of the sensing element 112 is varied.

In order that the detection value is not adversely affected by the conditions in which a vehicle is positioned, an improved configuration has been proposed. In the improved configuration, as shown in FIG. 16, a strain gauge type sensor 115 incorporating a sensing element is interposed between the leaf spring 14 and the axle case 110, and the axle case 110 is fixed to the leaf spring 114 by two U-bolts 20. In this configuration, since the sensor 115 is clamped between the two members 110 and 114, its detection value is not adversely affected even when the road surface is inclined and the vehicle is tilted.

When the sensor 115 is interposed between the leaf spring 114 and the axle case 110 and clamped using the two U-bolts 120 or the like as described above, however, the load applied to the sensor changes in accordance with the variation of the temperature because the thermal expansion coefficients of the leaf spring 114, the axle case 110, the bolts 120, etc. are different from each other. This produces a problem in that there exist a substantial error in a measured value of the loadage.

SUMMARY OF THE INVENTION

It is an object of the invention to provide a load measuring device for a vehicle having an improvement of a disposition of a sensing element of a strain gauge type sensor or the like, thereby suppressing the increase of the height of the vehicle.

It is another object of the invention to provide a load measuring device for a vehicle in which an accurate detection value can be obtained irrespective of variations of the circumstances such as the temperature.

It is another object of the invention to provide a structure for mounting a magnetic strain type sensing element for use in a vehicle load measuring apparatus which, even if mounted to a slide plate, does not cause the slide plate itself to be lowered in strength and also which is low in costs.

It is another object of the invention to provide a vehicle load measuring apparatus which does not increase the height of a vehicle, does not change its characteristic due to worn vehicle parts, and does not require the simultaneous replacement of a sensing element when the vehicle parts are replaced.

It is still another object of the invention to provide a structure for mounting a sensing element for measuring vehicle loads which is free from measuring errors even if a point of contact between a slide plate and a leaf spring is moved.

According to first aspect of the present invention, in a load measuring device for a vehicle which uses a strain gauge type sensor or the like, a sensing element of the strain gauge type sensor or the like is disposed in a slide plate or a leveling plate which is disposed between a leaf spring of the vehicle and an axle case to adjust the height of the vehicle.

According to second aspect of the present invention, in a load measuring device for a vehicle which uses a strain gauge type sensor or the like, sensing elements of the strain gauge type sensor or the like are respectively disposed between upper surfaces of flanges and a surface of a leaf spring, each of the flanges horizontally protruding from a side face of an axle case of the vehicle.

According to third aspect of the present invention, in a load measuring device for a vehicle which uses a strain gauge type sensor or the like, a sensing element of the strain gauge type sensor or the like is disposed in a thinned portion or center void space of a shackle.

According to fourth aspect of the present invention, in a load measuring device for a vehicle which uses a strain gauge type sensor or the like, a sensing element of the strain gauge type sensor or the like is disposed on a side face of a trunnion bracket of the vehicle.

According to fifth aspect of the present invention, in a load measuring device for a vehicle which uses a strain gauge type sensor or the like, sensing elements of the strain gauge type sensor or the like are disposed at a support bracket for a main leaf spring and a bumper bracket for an auxiliary leaf spring.

According to sixth aspect of the present invention, in a load measuring device for a vehicle which uses a strain gauge type sensor or the like, the strain gauge type sensor or the like has a reel-like shape in a side view in which a sensing element is disposed between an upper plate and a lower plate, the sensor is interposed between a leaf spring of the vehicle and an axle case, the vicinities of the ends of the upper plate are fixed to the leaf spring, and the vicinities of each of the ends of the lower plate are fixed to the axle case.

According to a seventh aspect of the present invention, there is provided a structure for mounting a magnetic strain type sensing element for a vehicle load measuring apparatus including a slide plate on the upper surface of an axle case and arranged to apply the load of a vehicle onto the slide plate for measurement of the vehicle load, wherein the sensing element is composed of a magnetic strain type plate-like member, a substantially U-shaped projection having a groove in the center thereof is provided opposite to the sensing element in the inner surface of the slide plate, and the sensing element is fitted into and fixed to the central groove of the projection.

Also, according to an eighth aspect of the present invention, there is provided a structure for mounting a magnetic strain type sensing element for use in a vehicle load measuring apparatus which measures the load of a vehicle of a type that includes a slide plate on the upper surface of an axle case and is arranged to apply the vehicle load through a leaf spring onto the slide plate, in which the sensing element is composed of a magnetic strain type plate member and, on the side surface of the slide plate, a substantially U-shaped projection having a groove in the center portion thereof is disposed opposite to the sensing element and the sensing element is fitted into and fixed to the central groove of the projecting.

Further, according to a ninth aspect of the present invention, there is provided a vehicle load measuring apparatus for measuring the load of a vehicle by disposing a sensing element for strain detection at a given portion of the vehicle, in which the sensing element is formed in a pin shape, there is opened up a hole in the central portion of a trunnion shaft for supporting the suspension of the vehicle, and the sensing element is fitted into the trunnion shaft central hole.

Still further, according to a tenth embodiment of the present invention, there is provided a vehicle load measuring apparatus for measuring the load of a vehicle by disposing a sensing element for strain detection at a given portion of the vehicle, in which the sensing element is formed in a pin shape, there is opened up a hole in the central portion of a shackle pin for connecting a shackle for supporting the suspension of the vehicle with a bracket mounted on the bed frame of the vehicle, and the sensing element is fitted into the shackle pin central hole.

Yet further, according to the eleventh aspect of the present invention, in the vehicle load measuring apparatus of the invention, there is formed a positioning groove on the surface of the trunnion shaft or shackle pin and, when the trunnion shaft is mounted onto a trunnion bracket or when the shackle is connected with a bracket mounted on the vehicle bed frame by the shackle pin, the trunnion shaft or shackle pin is positioned by screwing it by use of the positioning groove, thereby determining the direction of the load to be applied to the sensing element.

Moreover, according to a twelfth aspect the present invention, there is provided a structure for mounting a sensing element for measuring the load of a vehicle of a type that includes a slide plate on the upper surface of an axle case and is arranged to apply the load of the vehicle through a leaf spring onto the slide plate, in which there is provided a location for setting a sensing element in the neighborhood of the two end portions of the inner surface of the slide plate, and detected values obtained by the sensing element are added together and are then taken out.

In addition, according to a thirteenth of the present invention, the sensing element is composed of a frame having a substantially U shape when viewed from the side surface and front surface thereof and a plate-like member of a magnetic material fitted into the recessed portion of the frame and including a built-in coil, there are opened up grooves in the neighborhood of the two end portions of the inner surface of the slide plate as the setting portion for setting the sensing element, a cover is put on the slide plate from above and the sensing element is fitted into the grooves in the slide plate, and a taper key is inserted under the sensing element to thereby fix the sensing element.

According to a fourteenth aspect of the present invention, the sensing element is composed of a bottom plate part and a vertical plate part erected in the central portion of the bottom plate part, including a coil therein and formed of a magnetic material, there are formed grooves in the neighborhood of the two end portions of the inner surface of the slide plate as the location for setting the sensing element, a cover is put on the sensing element from above and the sensing element is fitted into the grooves, and a taper key is inserted under the sensing element to thereby fix the sensing element.

In these cases, preferably, on the lower surface of the sensing element, there is provide the taper angle corresponds to the taper angle of the taper key.

The above-described configuration can suppress the increase of the height of a vehicle to a small degree as compared with a prior art configuration in which a strain gauge type sensor is disposed on the upper face of an axle case and a leaf spring is supported by the upper face of the strain gauge type sensor. Accordingly, the workability of a cargo work is not impaired.

As described above, the sensor is provided with the upper and lower plates, the upper plate is attached to the leaf spring in the side of the rear body, the lower plate is attached to the axle case, and the fixing portions of the upper and lower plates are respectively positioned in the vicinities of their both ends. Therefore, the deformation of a portion due to the difference of components in thermal expansion coefficient takes place independently of that of another portion, so that only the loadage is applied to the sensor. This results in that the detection value of the sensor is not affected by the variation of the temperature.

According to the invention, due to the fact that the vehicle load measuring apparatus is structured in the above-mentioned manner, if the load of the vehicle is applied through the leaf spring onto the slide plate, then the load weight causes to deform or strain the slide plate and, as a result of this, the magnetic strain type sensing element is also strained to thereby generate an output. In this case, because no hole or the like is formed in the slide plate, the strength of the slide plate will never be decreased. Also, the same slide plate can be used in both a vehicle to which the sensing element is mounted and a vehicle to which no sensing element is mounted, which is advantageous in costs, and a process for mounting the sensing element is also simplified when compared with the conventional process.

Also, since the vehicle load measuring apparatus is structured in the above-mentioned manner, the load of the vehicle is applied through the trunnion shaft and bracket onto the shackle pin connecting the bracket with the shackle. This applies a shearing force to the trunnion shaft and shackle pin to thereby strain the sensing element disposed within the apparatus, so that the live load of the vehicle can be detected.

Further, because the positioning groove is formed on the surfaces of the trunnion shaft and shackle pin, if the loading direction to the sensing element is previously adjusted at the time when the sensing element is fitted to the holes formed in the trunnion shaft and shackle pin, then the loading direction to the sensing element can always be fixed.

Due to the fact that the present invention is structured in the above-mentioned manner, the load of the vehicle is applied through the leaf spring onto the slide plate. The load strains the slide plate to thereby strain the sensing element disposed within the apparatus, so that an output corresponding to the load applied can be generated.

In this operation, since the sensing elements are respectively disposed adjacent to the two end portions of the inner surface of the slide plate and the sum value of the respective detected values is then detected as output of the sensing elements, even if the contact point between the slide plate and leaf spring is moved due to change in the loads to change the direction of the force to be applied to the sensing elements to thereby incur deviations in the detected values, these deviations cancel each other so that no detection error can be produced.

BRIEF DESCRIPTION OF THE DRAWINGS

FIG. 33(a) is a bottom plan view of an eleventh embodiment of a vehicle load measuring apparatus according to the invention, when viewed from the bottom surface of a slide plate;

FIG. 33(b) is a section view of the eleventh embodiment when viewed from the side surface thereof;

FIG. 33(c) is a section view of the eleventh embodiment when viewed from the front surface thereof;

DETAILED DESCRIPTION OF PREFERRED EMBODIMENTS

Hereinafter, embodiments of the invention will be described with reference to the drawings.

First Embodiment

Figure 1A:
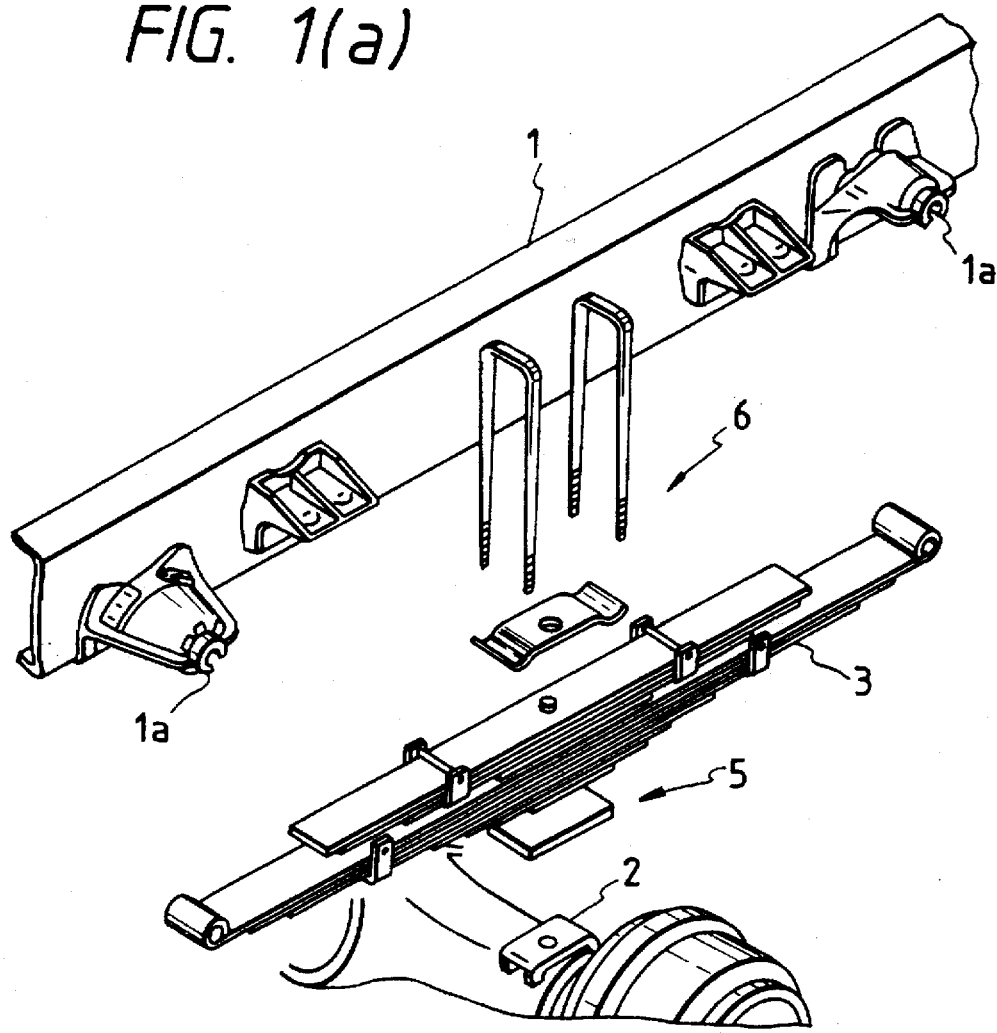
FIG. 1(a) is an exploded perspective view of first embodiment of the present invention.

FIG. 1(a) is an exploded perspective view of first embodiment of the present invention showing an assembly portion of a vehicle which comprises a rear body frame 1, an axle case 2, a leaf spring 3, a leveling plate 5, etc. Two brackets 1a which respectively support the ends of the leaf spring 3 are disposed on a side face of the rear body frame 1. The center portion of the leaf spring 3 is fixed to the axle case 2 by fixing members 6. The leveling plate 5 is interposed between the leaf spring 3 and the axle case 2.

Figure 1B:
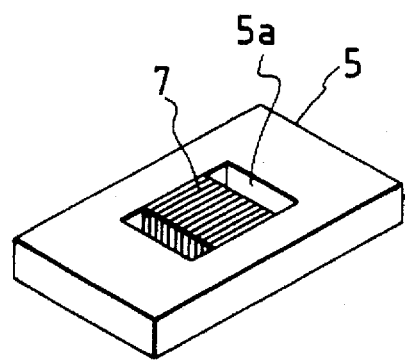
FIG. 1(b) is a perspective view of a leveling plate into which a sensing element is fitted according to the first embodiment of the present invention.

A sensing element of the strain gauge type used in the load measuring device for a vehicle according to the invention is incorporated in the leveling plate 5. As shown in FIG. 1(b), the leveling plate 5 has a shape of a thick rectangular plate and a recess 5a is formed at its center. A sensing element 7 is fitted into the recess 5a to be adhered or welded thereto. Lead wires of the sensing element 7, and other devices for the load measurement are not illustrated in the figure.

In this way, the sensing element 7 of the strain gauge type is fitted into the leveling plate 5 which is interposed between the leaf spring 3 and the axle case 2. Therefore, the increase of the loading surface altitude can be suppressed to a small degree as compared with a conventional art configuration in which a sensing element is interposed between an axle case and a leaf spring. Accordingly, the workability of a cargo work is not impaired.

Second Embodiment

Figure 2A:
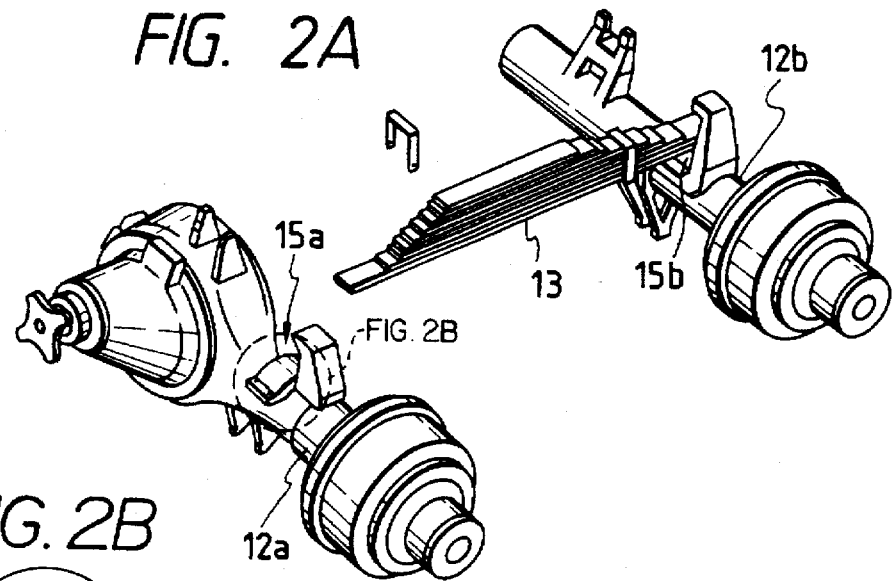
FIG. 2 is an exploded perspective view of the showing an assembly portion of second embodiment of the present invention.

Then, a second embodiment of the invention will be described. FIG. 2 is an exploded perspective view showing an assembly portion of a large vehicle having rear wheels which are arranged in tandem. The assembly portion comprises two axle cases 12(12a and 12b), a leaf spring 13, slide plates 15 (15a and 15b), etc. In the embodiment, since the two axle cases are juxtaposed tandem, the leaf spring 13 is fixed at its center portion to a rear body frame which is not shown. The ends of the leaf spring 13 are positioned above axle cases 12 (12a and 12b), respectively.

The curvature of the leaf spring 13 changes depending on the loadage so as to change the relative distances between the ends of the leaf spring 13 and the axle cases 12. Therefore, the slide plates 15(15a and 15b) having a hemisphere section are disposed on the upper faces of the axle cases 12, respectively, so that the end portions of the leaf spring 13 can slide over the faces of the slide plates 15.

A sensing element 7 of the strain gauge type used in the load measuring device for a vehicle of the embodiment is fitted into each of the slide plates 15. This configuration prevents the sensing elements 7 from being subjected to the lateral load which is generated by the leaf spring 13 curved by a change in loadage, thereby allowing an accurate detection value to be obtained. Since this configuration does not increase the loading surface altitude, ability to load and unload cargo is not impaired. Parts such as cases constituting the sensing elements 7 are not required so that the sensing elements can be easily assembled and their cost can be reduced.

Third Embodiment

Then, a third embodiment of the invention will be described. The components identical with those of the first embodiment are designated by the same reference numerals.

Figure 3:
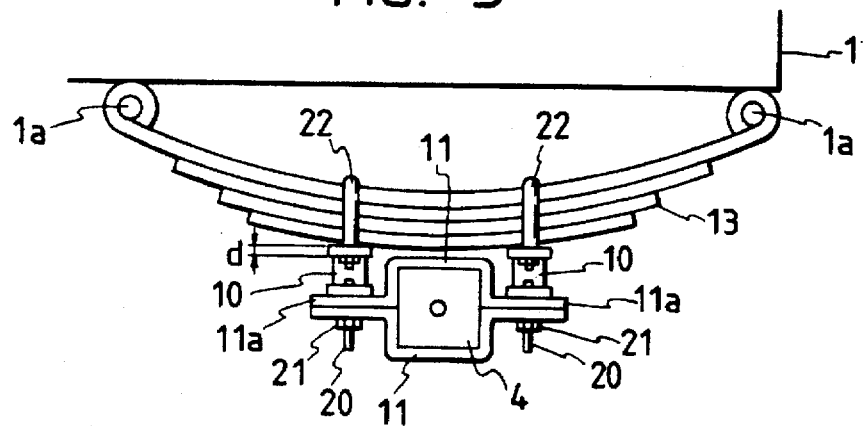
FIG. 3 is a side view showing an assembly portion of the third embodiment of third embodiment of the present invention.

FIG. 3 shows a configuration in which sensing elements 10 of the strain gauge type used in the load measuring device of the embodiment are disposed. As illustrated, sensor mounting plates 11 are fitted onto the upper and lower faces of an axle case 4 having a rectangular section. Each of the sensor mounting plates 11 is indented at its center portion to form a concave portion in a section view. The right and left portions (as viewed in the figure) of each of the sensor mounting plates 11 constitute flat flanges 11a in which tapped holes (not shown) are formed. The sensor mounting plates 11 are placed on the upper and lower faces of the axle case 4, respectively. The sensing elements 10 of the strain gauge type are disposed on the flanges 11a and fixed thereto by bolts 20 and nuts 21, respectively.

The sensing elements 10 are secured to the leaf spring 13 by U-bolts 22 in such a manner that the upper face of each of the sensing elements 10 is contacted with the lower face of the leaf spring 13. In this state, the upper face of the sensor mounting plate 11 placed on the upper face of the axle case 4 is separated by a small gap from the lower face of the leaf spring 13, so that the load applied to the leaf spring 13 is applied to the axle case 4 through the sensing elements 10 and the sensor mounting plates 11. The increase of the altitude of the rear body frame 1 caused by the provision of the sensing elements 10 coincides with the distance d between the upper face of the axle case 4 and the lower face of the leaf spring 13.

The distance d can be made smaller than the height of the sensing elements 10, and therefore the increase of the loading surface altitude can be suppressed to a small degree, thereby preventing the workability of a cargo work face being impaired.

Fourth Embodiment

Then, a fourth embodiment of the invention will be described.

Figure 4:
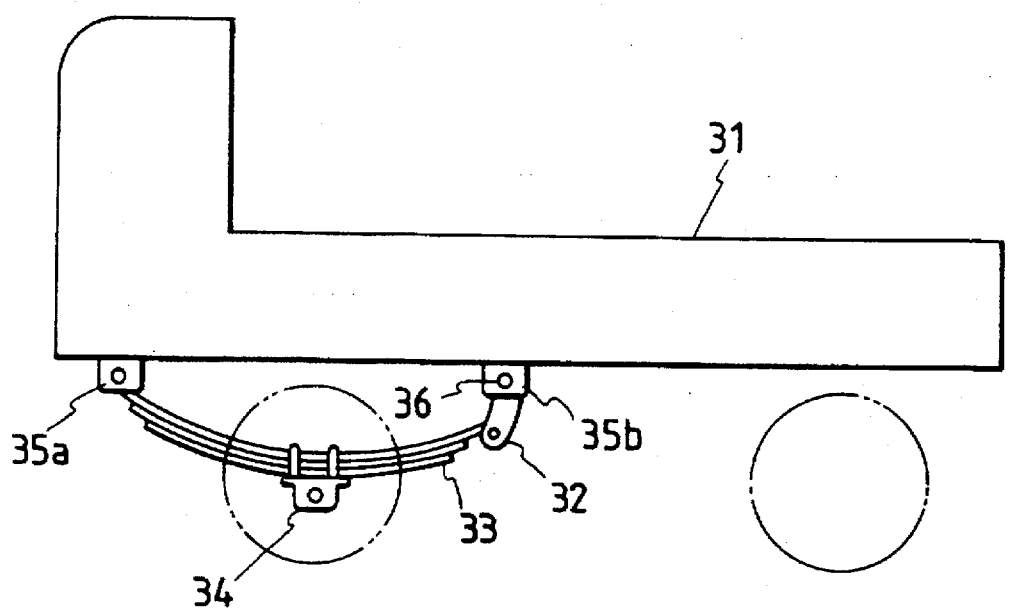
FIG. 4 is a side view of a vehicle having the load measuring device of fourth embodiment of the present invention.

FIG. 4 shows a side of a vehicle in which the load measuring device of the fourth embodiment is used. In a large vehicle, generally, an axle case 34 is attached to a leaf spring 33 as shown in the figure. One end of the leaf spring 33 is supported by a bracket 35a attached to a rear body frame 31, and the other end of the leaf spring 33 is supported through a shackle 32 by a bracket 35b attached to a rear body frame 31 in a similar manner.

When a load is to be measured in such a configuration, usually, a sensing element is attached to a shackle pin 36 connecting the bracket 35b with the shackle 32 and measures the shearing force acting on the shackle pin 36. In order to incorporate the sensing element, however, it is necessary that a hole is formed in the center portion of the shackle pin 36 and the sensing element is positioned in the hole. When the shackle pin 36 has a small diameter, the formation of the hole may cause the strength of the shackle pin 36 to be reduced.

Figure 5A:
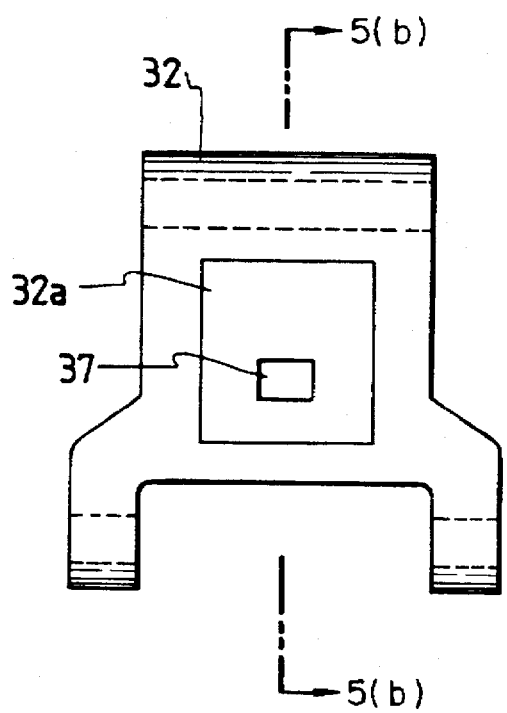
FIG. 5(a) is a front view showing a state where a sensing element is attached to a shackle of fourth embodiment of the present invention.
Figure 5B:
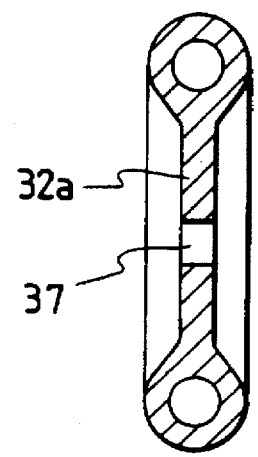
FIG. 5(b) is a section view of the shackle taken along line B—B of FIG. 5(a)

To comply with this problem, in the embodiment, a sensing element 37 of the strain gauge type is attached to a thin portion (called "NIKUNUSUMI") 32a of the shackle 32 as shown in a front view of FIG. 5(a). When the sensing element 37 is of the strain gauge type, it may be attached on the thin portion 32a. When the sensing element 37 is of the magnetostriction type, it may be fitted into a hole bored through the thin portion 32a as shown in a section view of FIG. 5(b). In a case where the portion of the shackle 32 corresponding to the thin portion 32a has a thickness of zero or is formed as a so-called void space, the sensing element 37 of the magnetostriction type may be disposed so as to bridge the upper and lower ends of the void space, and fixed thereto by the welding or the like. In the viewpoint of reducing the weight, this configuration is adopted because substantially no force generally acts on the thin portion 32a or void space of the shackle 32. Even if that portion is processed so as to mount the sensing element 37, therefore, no effect is exerted on the strength of the shackle 32. Moreover, since this configuration does not increase the loading surface altitude, the workability of a cargo work is not impaired.

Fifth Embodiment

Then, a fifth embodiment of the invention will be described.

Figure 6:
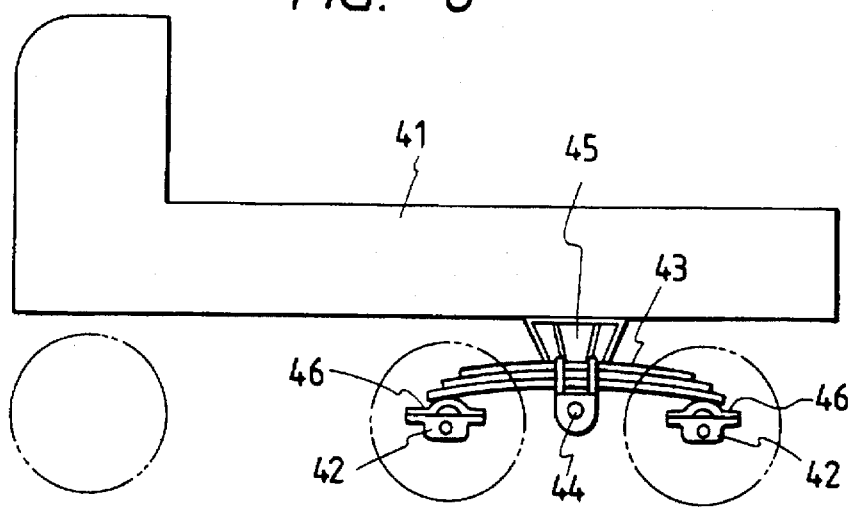
FIG. 6 is a side view of a vehicle having two rear axles of the fifth embodiment of the present invention.

FIG. 6 shows a side of a vehicle in which the load measuring device of the fifth embodiment of the invention is used. The suspension of a usual large truck having two rear axles is mainly constructed as a trunnion suspension. As illustrated, two axle cases 42 are supported by a leaf spring 43 which is fixed to a trunnion shaft 44. The trunnion shaft 44 is fitted into a hole formed at the center portion of a trunnion bracket 45 which is secured to a rear body frame 41, and supported by the bracket.

In this configuration where two axle cases 42 are juxtaposed tandem, the relative distances between the ends of the leaf spring 43 and the axle cases 42 are changed when the curvature of the leaf spring 43 changes depending on the loadage. Therefore, slide plates 46 having a hemisphere section are disposed on the upper faces of the axle cases 42, respectively, so that the end portions of the leaf spring 43 can slide over the faces of the slide plates 46.

The load measurement of a vehicle of such a type may be conducted using a sensing element which is fittingly incorporated in the slide plates 46 in the same manner as the second embodiment. In this configuration, however, the sliding movement of the leaf spring 43 over the faces of the slide plates 46 causes the slide plates 46 to be abraded away, thereby varying the strength of the slide plates 46. There exists the possibility that the output characteristics of the sensing elements may change by the variation of the strength of the slide plates 46. Generally, the slide plates 46 are treated as expendable parts, and it is often that, when abraded to some extent, the slide plates 46 are replaced with new ones. If a sensing element is incorporated in each of the slide plates 46, an abraded slide plate must be replaced together with the sensing element incorporated therein, producing a problem in that the cost of replacement becomes high due to it is required that the sensing elements are respectively disposed at the both ends of the two rear axles. Namely, four slide plates 46 in each of which a sensing element is incorporated are required for one truck, resulting in that the cost is further increased.

Figure 7:
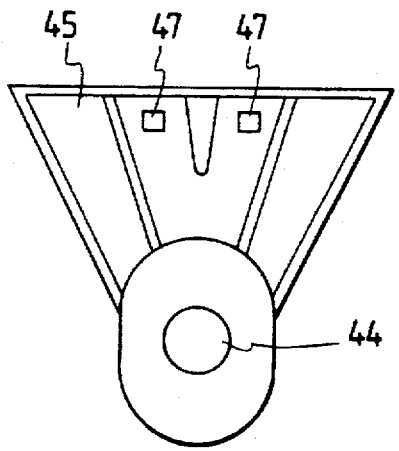
FIG. 7 is a front view of the fifth embodiment of the present invention showing a state where sensing elements are attached to a trunnion bracket.

In the embodiment, as shown in FIG. 7, the sensing elements 47 are attached to a side face of the trunnion bracket 45. The sensing elements 47 may be embedded in a recess formed on the side face of the trunnion bracket 45.

The disposition of the sensing elements 47 at that position does not increase the loading surface altitude. Since the trunnion bracket 45 is significantly larger than the portions at which the sensing elements 47 are located, the strength of the bracket 45 is not reduced. The trunnion bracket 45 is not an expendable part, and therefore it is not required to consider the expense for replacement.

Sixth Embodiment

Then, a sixth embodiment of the invention will be described.

Figure 8:
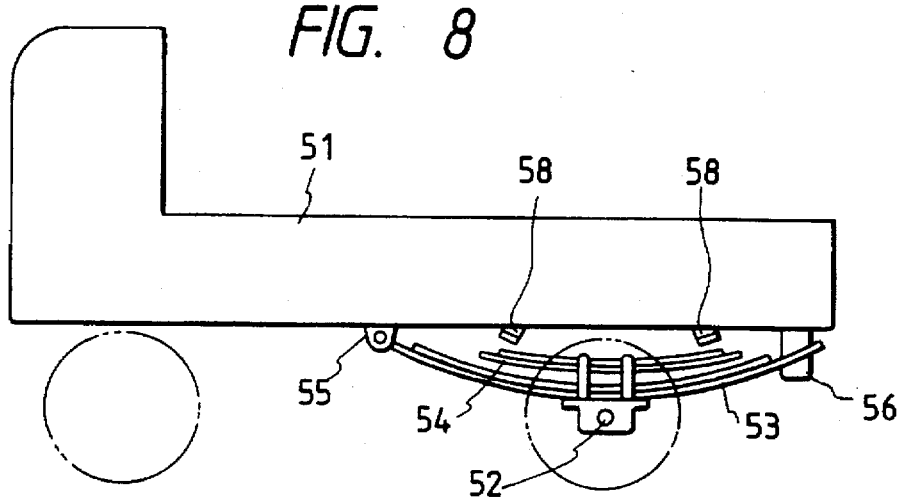
FIG. 8 is a side view of a vehicle having an auxiliary leaf spring according to sixth embodiment of the present invention.

FIG. 8 shows a side of a vehicle in which the load measuring device of the sixth embodiment of the invention is used. As illustrated, the suspension of a usual large truck having one rear axle consists of a main leaf spring 53 supporting an axle case 52, and an auxiliary leaf spring 54 overlaid on the main leaf spring 53. The main leaf spring 53 is supported by a bracket 55 and a supporting member 56 which are attached to a rear body frame 51, and the ends of the auxiliary leaf spring 54 are free.

Bumper brackets 58 for the auxiliary leaf spring are attached to the rear body frame 51 so that, when the vehicle runs over an irregular road and jolts heavily, the auxiliary leaf spring 54 bumps the bumper brackets 58 to suppress the jolt.

Even when the vehicle is at rest, however, if the loadage reaches 40% of the specified allowable load, the auxiliary leaf spring 54 begins to contact with the bumper brackets 58. Therefore, when sensing elements for measuring the loadage are attached only to the brackets 55 and 56 for the main leaf spring 53, it is impossible to accurately measure the loadage.

Figure 9:
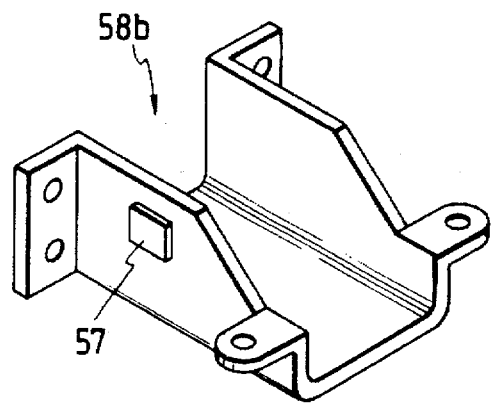
FIG. 9 is a perspective view showing a state where a sensing element is attached to a side face of an upper housing of a bumper bracket for an auxiliary leaf spring.
Figure 10:
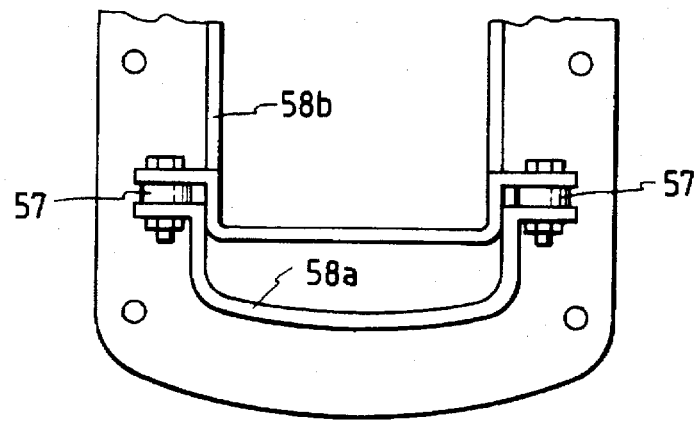
FIG. 10 is a front view showing a state where sensing elements are interposed between upper and lower housings of a bumper bracket for an auxiliary leaf spring.
Figure 11:
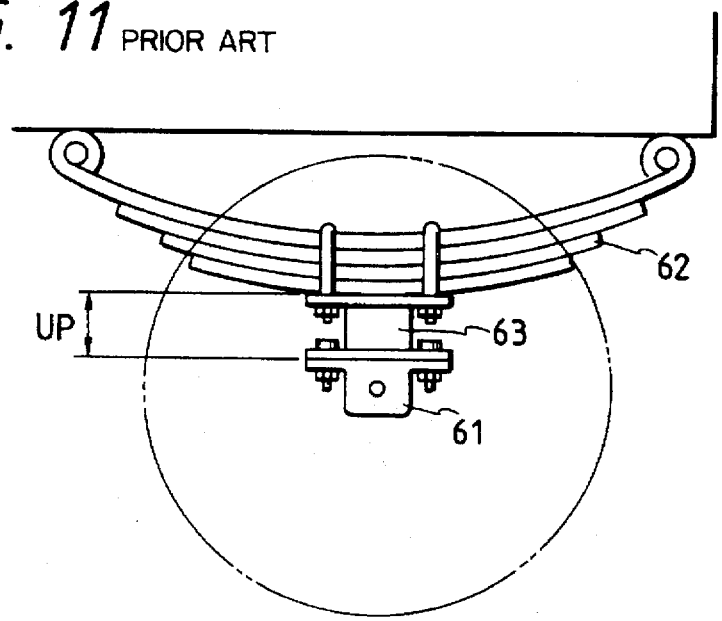
FIG. 11 is a view showing a conventional manner of attaching a sensing element of the strain gauge type.
Figure 12:
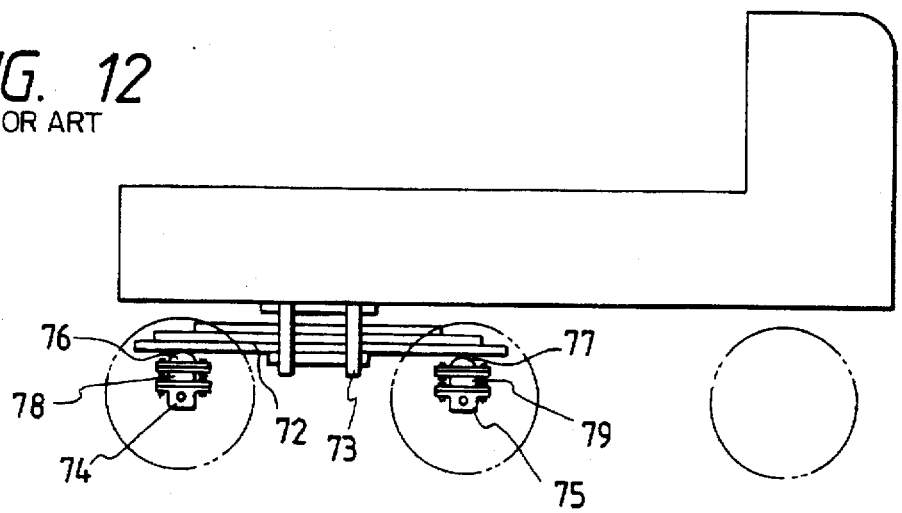
FIG. 12 is a view showing another conventional manner of attaching sensing elements of the strain gauge type.

Accordingly, in the embodiment, as shown in FIG. 9, a sensor 57 incorporating a sensing element is disposed also on a side face of a lower housing 58a of each of the bumper brackets 58 for the auxiliary leaf spring. Alternatively, as shown in FIG. 10, the sensing element 57 may be interposed between the lower housing 58a and upper housing 58b of each of the bumper brackets 58.

According to the embodiment, since the sum of a load applied to the auxiliary leaf spring 54 and that applied to the main leaf spring 53 is measured, it is possible to accurately measure the loadage. Furthermore, since the loading surface altitude is not increased, the workability of a cargo work is not impaired.

Seventh Embodiment

Then, a seventh embodiment of the invention will be described.

Figure 17:
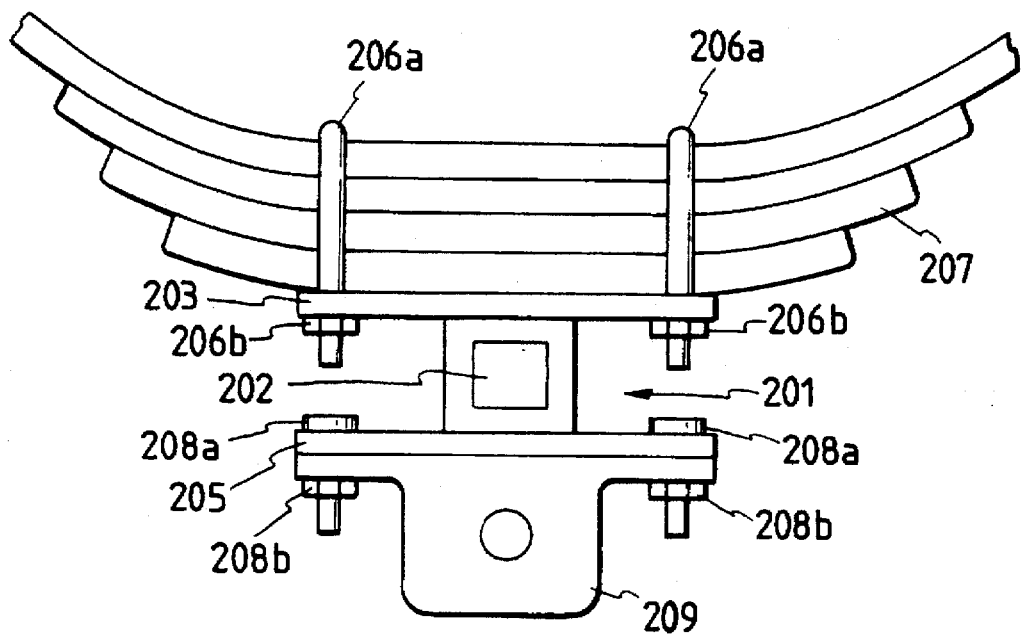
FIG. 17 is a view showing a state where a strain gauge type sensor used in a load measuring device for a vehicle which is an embodiment of the invention is disposed between a leaf spring and an axle case.

FIG. 17 shows an example of the disposition of a strain gauge type sensor 201 used in a load measuring device for a vehicle which is an embodiment of the invention. As illustrated, the strain gauge type sensor 201 comprises a sensing portion 202 incorporating a sensing element, a substantially rectangular upper plate 203 fixed to the upper side of the sensing portion 202, and a lower plate 205 fixed to the lower side of the sensing portion 202. Four holes are formed in the vicinities of the both ends of each of the upper and lower plates 203 and 205. Using these holes, the upper plate 203 is closely fixed to a leaf spring 207 by U-bolts 206a and nuts 206b, and the lower plate 205 is closely fixed to an axle case 209 by bolts 208a and nuts 208b.

The widths (the dimension along the right and left directions as viewed in the figure) of both the upper and lower plates 203 and 205 are considerably greater than the width of the sensing portion 202 positioned at the center, so that the sensor 201 has a shape in a side view resembling that of a reel (or a bobbin) around which a cord or the like is to be wound. The both ends of the upper and lower plates 203 and 205 are fixed to the leaf spring 207 and the axle case 209 by the bolts 206a and 208a, respectively. Accordingly, even when the variation of the temperature causes various portions to deform owing to the difference of components in thermal expansion coefficient, the clamping forces of the fixing bolts 206a and 208a exert substantially no effect on the sensing portion 202 positioned at the center, resulting in that only the loadage is applied to the sensor 201.

Figure 18A:
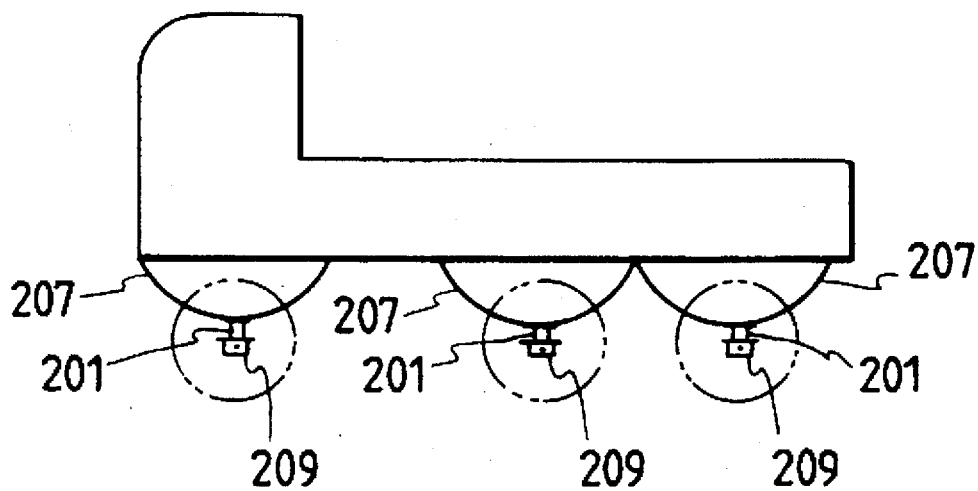
FIGS. 18(a) and 18(b) are diagrams showing positions at which strain gauge type sensors are disposed.
Figure 18B:
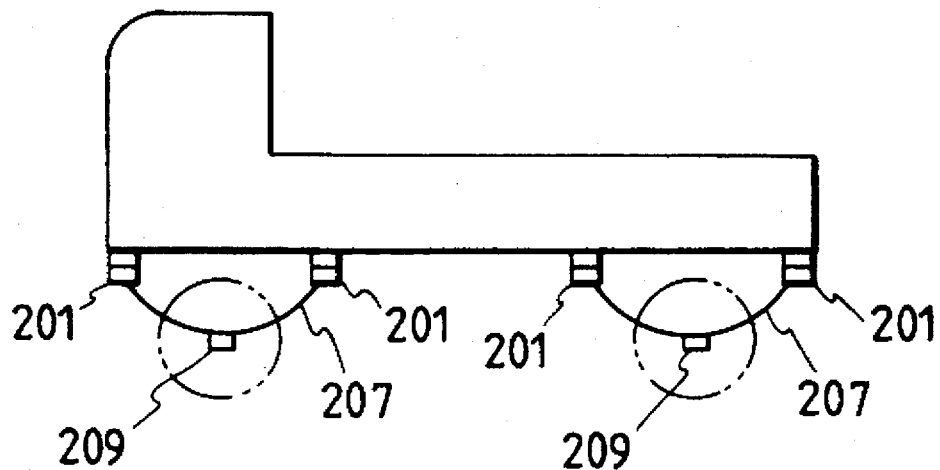

In this configuration, the sensor 201 directly receives all loads. Therefore, even in a case of the unbalanced load, all loads are applied to the sensor 201. This allows the load measuring device to perform the measurement with an excellent accuracy under any conditions and to be subjected to a reduced level of a change with the passage of time. Since the sensor 201 is interposed between the leaf spring 207 and the axle case 209, the number of positions at which the sensor 201 is disposed are six when, as shown in FIG. 18(a), the vehicle is provided with three leaf springs 207 at each of the right and left sides of the vehicle. In this case, when the weights measured by these sensors 201 are respectively indicated by $W_1R$, $W_2R$, $W_3R$, $W_1L$, $W_2L$, and $W_3L$, the loadage W is calculated by the following expression:

Loadage $W=W_1R+W_2R+W_3R+W_2L+W_2L+W_3L$

Figure 2B:
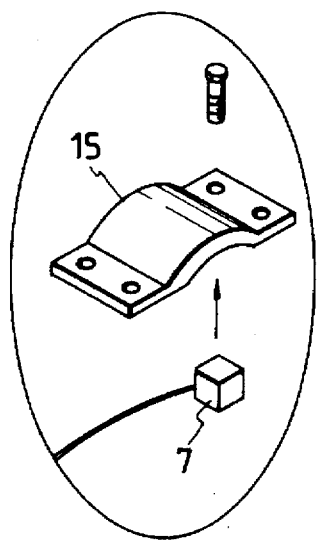

When the sensors 201 are disposed in the portions connecting the leaf springs 207 and the rear body in such a manner that they are interposed therebetween, as shown in FIG. 2(b), the number of the sensors 201 is twice that of the leaf springs 207.

As the sensing elements, the embodiments described above use mainly those of the strain gauge type. Alternatively, other sensing elements of various kinds including those of the magnetostriction type and the piezo type may be used.

As described above, according to the invention, even when a sensing element of the strain gauge type or the like which is used in a load measuring device for a vehicle is interposed between an axle case and a leaf spring, the increase of the loading surface altitude can be suppressed to a small degree. Therefore, the workability of a cargo work is prevented from being impaired, and there is no possibility of increasing the burden on a worker.

As described above, according to the invention, the upper and lower plates of the strain gauge type sensor are formed so as to have a large size, the sensor is interposed between a leaf spring of a vehicle and an axle case, the vicinities of the ends of the upper plate are fixed to the leaf spring, and the vicinities of the ends of the lower plate are fixed to the axle case. Therefore, even when the variation of the temperature causes various portions to deform owing to the difference of components in thermal expansion coefficient, the deformation exerts substantially no effect on the sensor, thereby enabling the sensor to obtain an accurate detection value.

Eighth Embodiment

Figure 23:
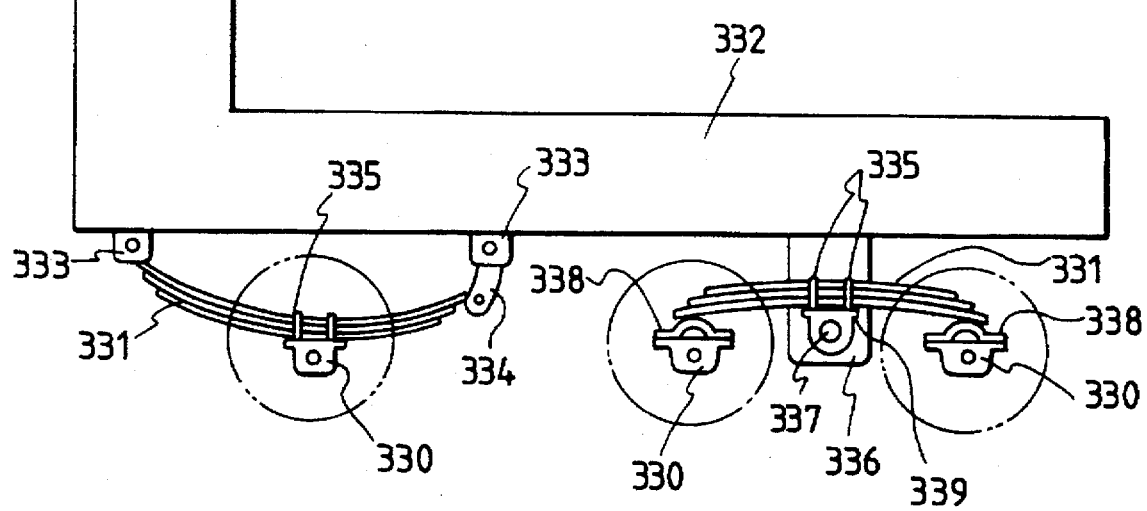
FIG. 23 is a side view of a vehicle of a type that has two axle cases for rear wheels.

Description will be given below in detail of an eighth embodiment of the invention. In a vehicle which is large in size and includes two axle cases for rear wheels thereof, since the axle cases are arranged in two longitudinal lines, as shown in FIG. 23, the central portion of a leaf spring 331 is fixed through a spring seat 339 to a trunnion shaft 337 mounted to a trunnion bracket 336 by two U-shaped bolts 335. The two end portions of the leaf spring 331 are respectively positioned on the top portions of axle cases 330.

In this case, since the degree of bending of the leaf spring 72 is changed according to the live loads of the vehicle to thereby change a relative length between the axle cases 330, two slide plates 338 each having a hemispherical section are disposed respectively on the upper surfaces of the axle cases 330 so that the end portions of the leaf spring 331 can be slid on and along the upper surfaces of the slide plates 338.

According to the eighth embodiment of the invention, in a vehicle of the above-mentioned type, sensing elements 310 for measuring the load of the vehicle are respectively mounted within the slide plates 338, whereby the sensing elements 310 can detect the strain of the slide plates 338 caused by the load given by the leaf spring 331 to thereby measure the live load of the vehicle.

In this arrangement, even if the leaf spring 331 is bent due to change in the live load, this does not provide a lateral load to the sensing element 310, so that an accurate detect value can be obtained.

In the structure in which the sensing elements are mounted within the slide plates respectively, it is true that the height of the vehicle bed is not increased. But, however, because the leaf spring is slid on the surfaces of the slide plates, the slide plates may be worn to change the strength thereof, which can cause the characteristic of the output of the sensing elements to vary. Also, in general, the slide plates are expendables and thus they may be replaced with new ones when they are worn to a certain extent. However, if the sensing element is built in the slide plate, then the slide plate and sensing element must be replaced simultaneously as an integral unit, which results in high costs. Further, since the slide plates must be mounted to the front, rear, right and left portions of the vehicle, there are required four slide plates each incorporating a sensing element therein, which results in the increased manufacturing costs.

Figure 24:
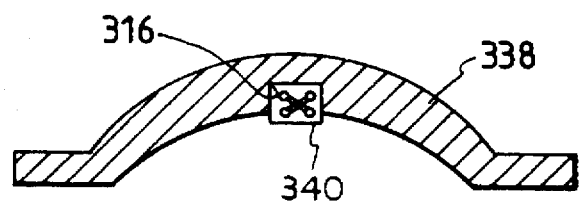
FIG. 24 is a view of a eighth embodiment of a structure for mounting a sensing element.

Further, to say nothing of the above-mentioned structure in which the strain gauge type sensing element 330 is disposed within the slide plate 338, in a case where a strain gauge type sensing element of a higher stability is disposed, normally, as shown in FIG. 24, a hole 316 is formed in the inner surface of the slide plate 338, the sensing element 330 is fitted into the hole 316 to assemble them together, and then the assembly is welded together. However, this can offer the possibility that the strength of the slide plate 338 can be lowered.

Figure 25:
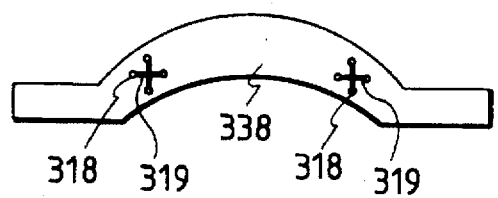
FIG. 25 is a view of another embodiment of a sensing element mounting structure according to the invention.

Also, as shown in FIG. 25, there is available a method in which small holes 318 are formed on the side surface of a slide plate 338 and coils 319 are wound through the small holes 318 respectively to thereby use the whole slide plate 338 as a sensing element. However, in this method, because the whole slide plate 338 must be formed of a special magnetic material such as permalloy or the like, the cost of the slide plate 338 is high and also a sufficient strength cannot be obtained.

The following embodiments are devised in the light of the above-mentioned eighth embodiment.

Ninth Embodiment

Figure 26A:
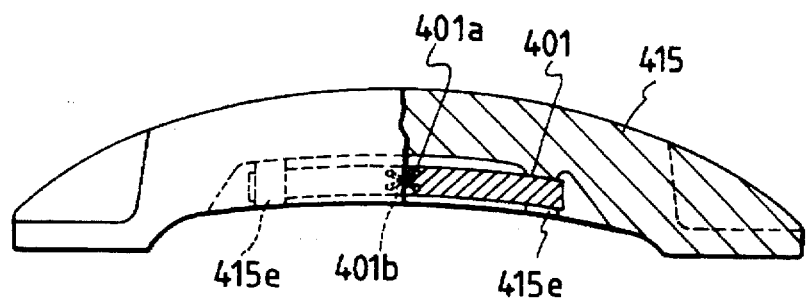
FIG. 26(a) is a side view, partly in section of a ninth embodiment of a vehicle load measuring apparatus according to the invention.
Figure 26B:
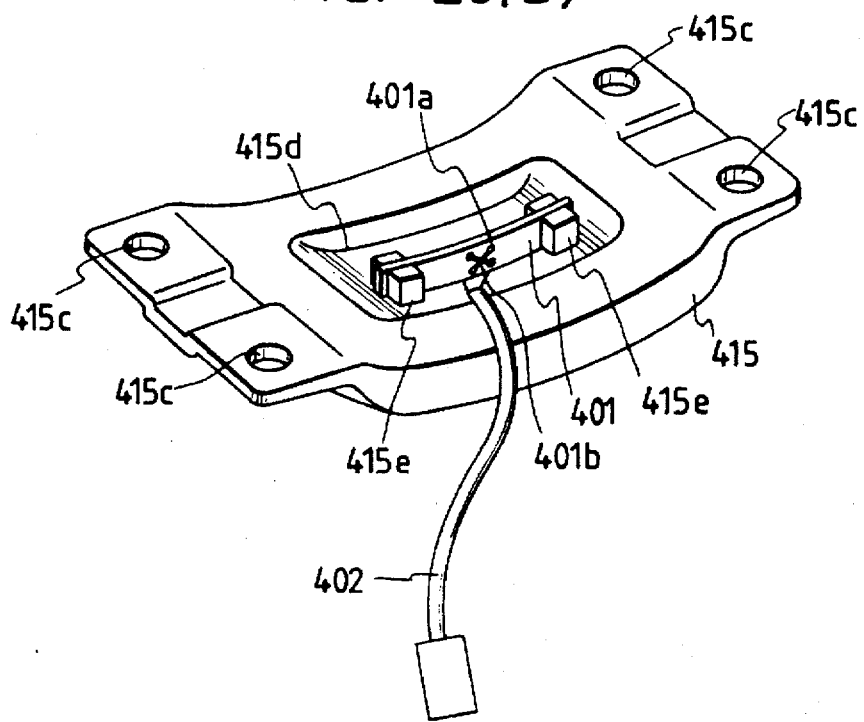
FIG. 26(b) is a perspective view of the ninth embodiment shown in FIG. 26(a), when viewed from the bottom surface thereof.

In FIG. 26(a), there is shown a side view, partially in section, of the eighth embodiment of a mounting structure for mounting a magnetic strain type sensing element for a vehicle load measuring apparatus according to a ninth embodiment of the invention. In FIG. 26(b), there is shown a perspective view of the mounting structure shown in FIG. 26 (a), when viewed from the bottom surface side thereof.

In FIGS. 26(a) and (b), reference character 415 designates a slide plate which includes four screw holes in the two end portions thereof for mounting the slide plate to axle cases, and also which includes a rectangle-shaped recessed portion 415d in the central portion thereof. The recessed portion 415d (so-called NIKUNUSUMI) is referred to as a lightening portion which is normally hard to apply a load. That is, the recessed portion is arranged to be smaller in thickness for the purpose of lightening the weight of the slide plate 415.

Also, in the recessed portion 415d, two projections 415e each having a substantially U-like shape and also having a narrow groove in the center portion thereof are disposed opposite to each other. A rectangular plate-shaped sensing element 401 is inserted into and welded to the groove of each of the projection 415e. The sensing element 401 is formed of a magnetic material such as permalloy and the like and includes four small holes 401a opened up in the central portion thereof. A coil 401b is wound through these four holes 401a and is drawn out externally by means of a lead wire 402.

Figure 28:
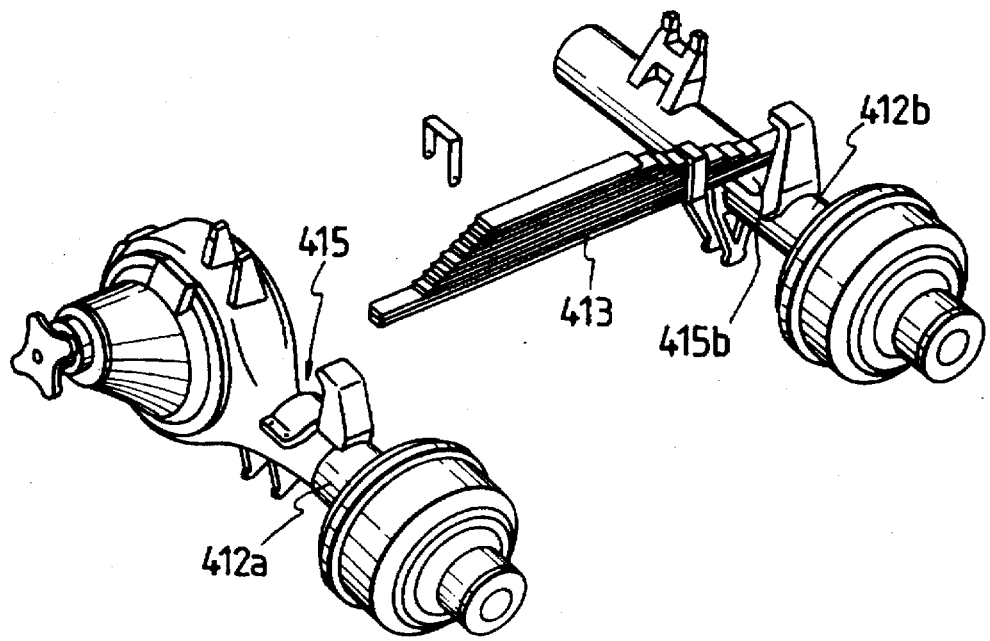
FIG. 28 is an exploded perspective view of an assembly portion in which a slide plate, an axle, a leaf spring and the like are assembled.

As shown in FIG. 28, the slide plate 415 is mounted onto an axle case 412 (which includes two axle cases 412a and 412b), and the lead wire 402 is connected to a main body of a measuring apparatus (not shown) in order to measure the load of the vehicle.

Due to the fact that the present embodiment is structured in this manner, there is eliminated the need to open up a hole for mounting the sensing element 401 in the surface of the slide plate 415, which in turn avoids the possibility that the strength of the slide plate 415 can be lowered. Also, since the special magnetic material must be used only for the plate-shaped portion of the sensing element and there is eliminated the need that the whole of the slide plate 415 must be formed of the special magnetic material, the slide plate 415 can be manufactured at a relatively low cost and also there is eliminated the possibility that the strength of the slide plate can be lowered. Further, not only a vehicle to which a sensing element is mounted but also a vehicle to which no sensing element is mounted can use the same slide plate, which is advantageous in the manufacturing cost. In addition, a process for mounting a sensing element can be simplified when compared with the conventional process.

Tenth Embodiment

Next, description will be given below of a tenth embodiment of the invention.

Figure 27:
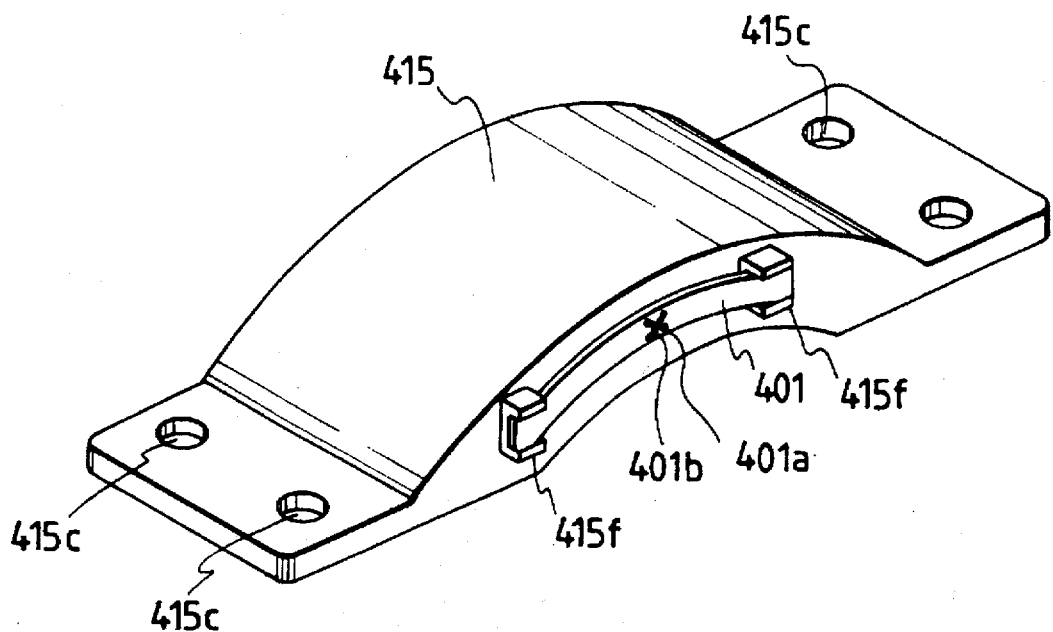
FIG. 27 is a perspective view of the ninth embodiment according to the invention.

In FIG. 27, there is shown a perspective view of the tenth embodiment of a mounting structure for mounting a magnetic strain type sensing element for a vehicle load measuring apparatus according to the invention. In the tenth embodiment, the same parts or equivalent parts to those described in the ninth embodiment are given the same reference characters.

As shown in FIG. 27, two projecting portions 415f each having a wide groove in the central portion thereof are provided opposite to each other on the side surface of a slide plate 415, and a rectangular plate-like sensing element 401 is inserted into and welded to the grooves of the projecting portions 415f, 415f. The tenth embodiment, unlike the ninth embodiment, is characterized in that the sensing element 401 is mounted to the outside of the slide plate 415.

The mounting structure for mounting the sensing element 1 according to the present embodiment provides substantially the same effects as in the ninth embodiment and thus the description thereof is omitted here.

As has been described heretofore, according to the ninth and tenth embodiments of the invention, even if a magnetic strain type sensing element is mounted to a slide plate, there is eliminated the possibility that the strength of the slide plate itself can be lowered and also the costs of the ninth and tenth embodiments can be minimized.

Eleventh Embodiment

On the other hand, in the ninth and tenth embodiments of the invention, since the contact point between the slide plate and leaf spring is moved according to the change in the loads of the vehicle, the direction of the force to be applied to the sensing element is caused to vary, which can give rise to measuring errors.

Now, description will be given below of an eleventh embodiment of a vehicle load measuring apparatus according to the invention with reference to the accompanying drawings. In the eleventh embodiment, the same parts or equivalent parts to those described in connection with the ninth and tenth embodiments are given the same designations.

In FIGS. 33(a) to (c), there is shown the eleventh embodiment of a mounting structure for mounting a sensing element for a vehicle load measuring apparatus according to the invention. In particular, in FIG. 33(a), there is shown a bottom plan view of a slide plate 415 for mounting a sensing element, in which a base plate 416 is mounted. In FIG. 33(b), there is shown a section view of the slide plate 415 in which a sensing element 401 is mounted and a cover 423 is placed on the sensing element 401 from above. Also, in FIG. 33(c), there is shown a section view of the slide plate 415 when viewed from the front side thereof. In the eleventh embodiment, the slide plate 415 is formed of carbon steel.

As shown in FIGS. 33(a) to (c), on the two end portions of the inner surface of the slide plate 415, there are provided setting portions 415f which are respectively used to set the sensing element 401. Each of the setting portions 415f is interposed between two screw holes 415c for mounting the same to an axle case. The setting portion 415f includes a rectangular shallow groove $415f_1$, a wide and narrow groove $415f_2$ which is opened up so as to extend from the center of the slide plate 415 to the central portion of the shallow groove $415f_1$, and two middle-deep grooves $415f_3$ respectively opened up on the two sides of the deep groove $415f_2$.

The shallow groove $415f_1$ is a portion on which a cover to be described later is fitted, the middle-deep grooves $415f_3$ are portions with which the sensing element 401 is fitted, and the deep groove $415f_2$ is a groove into which a taper key is fitted.

Also, as shown in FIGS. 33(a) to (c), an elongated rubber member 417 is bonded to the inner surface of the slide plate 415 in a manner to extend from the setting portion 415f of the sensing element 421 toward the central portion thereof, and the base plate 416 is fitted into the central portion of the rubber member 417. Also, the rubber member 417 includes a groove which is opened up along the central portion of the rubber member 417, a lead wire 422 of the sensing element 421 is fitted into the groove and is bonded and fixed by adhesives to the groove, and the leading end of the lead wire 422 is connected to the base plate 416.

In the illustrated embodiment, only one side of the rubber member 417 is shown but the other side thereof is not shown.

Further, in a recessed portion 415 formed in the inner surface of the slide plate 415, there is provided a U-shaped projection 419a, a cable 418 is fitted into the recessed portion of the projection, and a cover 419b is screwed to the cable 419b from above. The end portion of the cable 419b is connected to the base plate 16, whereby the detected values of the sensing elements 421 respectively disposed in the two end portions of the slide plate 415 are added together and are then guided externally.

Figure 34:
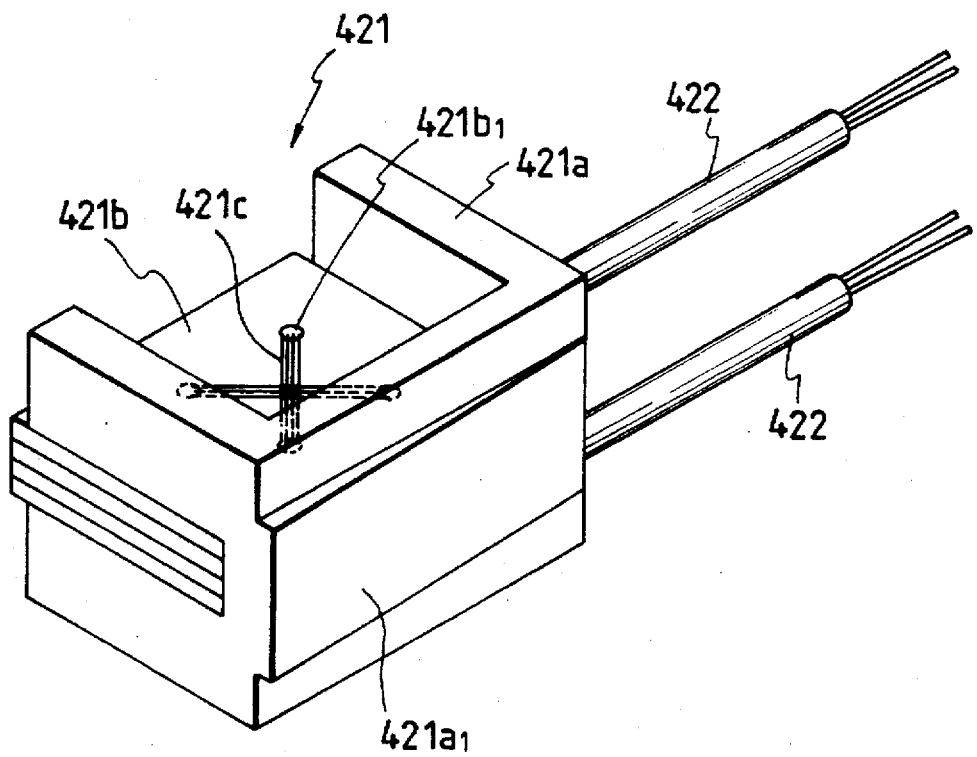
FIG. 34 is a perspective view of a sensing element of the eleventh embodiment of the present invention.

The sensing element 421, as shown in FIG. 34, includes a frame 421a which is U-shaped when viewed from the front thereof as well as when viewed from the side thereof and, in the bottom surface of the frame 421a, there is provided a rectangular projection $421a_1$ having a taper.

Also, a plate-like member 421b consisting of several pcs. of magnetic materials is fitted into the recessed portion of the frame 421a, and four holes $421b_1$ are formed in the plate-like member 421b. Also, a coil 421c is wound obliquely crosswise by use of the four holes $421b_1$ and the end portion of the coil 421c is drawn out as a lead wire 422.

Figure 35:
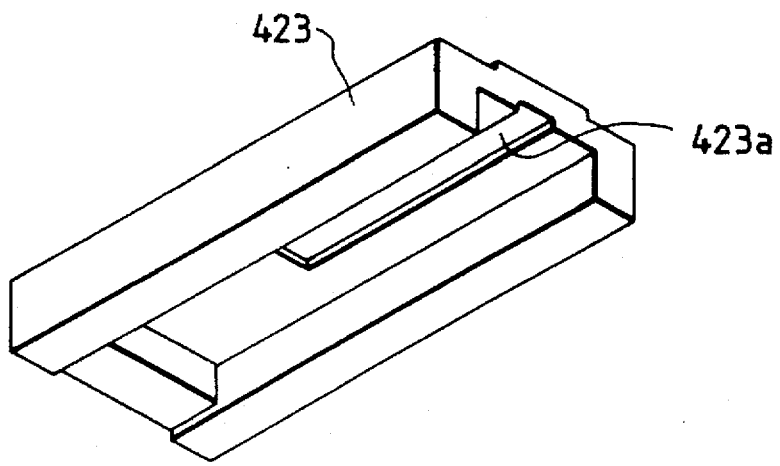
FIG. 35 is a perspective view of a cover of the eleventh embodiment of the present invention.
Figure 36:
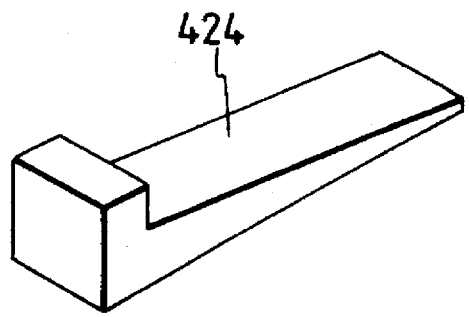
FIG. 36 is a perspective view of a taper key of the eleventh embodiment of the present invention.

Further, a cover 423 can be mounted on the upper portion of the sensing element setting portion 415f of the slide plate 415 and the cover 423, as shown in FIG. 35, is formed in a substantially U shape.

In part of the inner surface of the cover 423, there is formed a groove 423a into which is fitted the end portion of the plate-like member 421 slightly projected from the frame 421a of the sensing element 421.

The cover 423 is placed on the sensing element setting portion 415f of the slide plate 415 and is welded or bonded to the portion 415f, and the sensing element 421 is fitted into the cover 423. And such a taper key 429 as shown in FIG. 35 is inserted under the sensing element 421 and is abutted against the rectangular projection $421a_1$ of the bottom surface of the sensing element 421 to thereby fix the sensing element 421 firmly.

Figure 37:
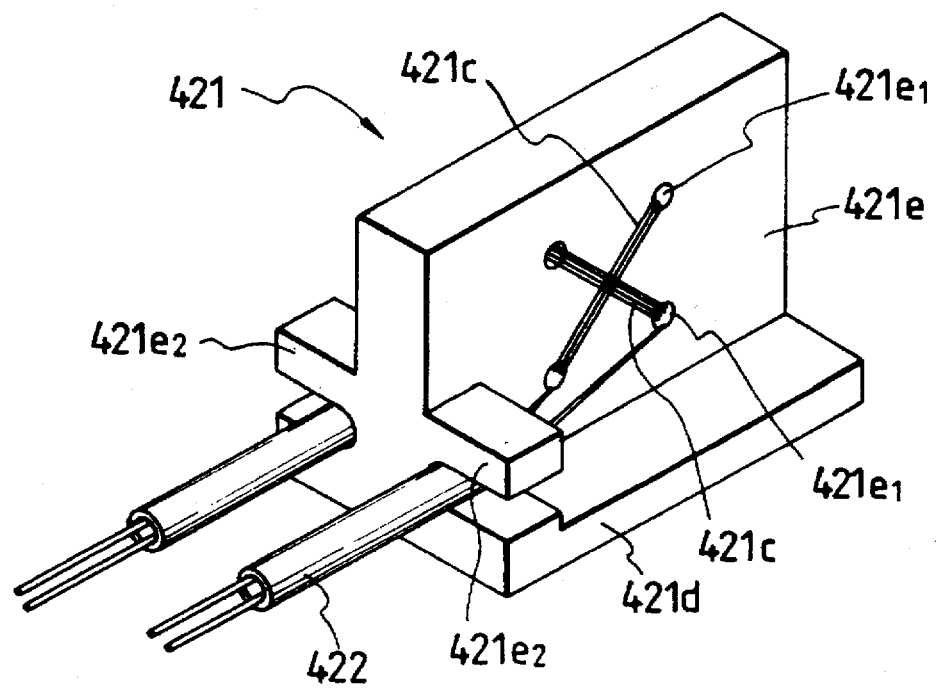
FIG. 37 is a perspective view of a modification of the sensing element shown in FIG. 34.

Alternatively, as shown in FIG. 37, the sensing element 421 may be formed of a bottom plate part 421d and a vertical plate part 421e erected on the central portion of the bottom plate part 421d, while four holes $421e_1$ may be formed in the vertical plate part 421e and a coil 421c may be assembled to the vertical plate part by use of the four holes $421e_1$. In this case, the sensing element 421 may be preferably formed of a magnetic material integrally. A projection $421e_2$, which is provided in the vertical plate part 421e, is used to fix a lead wire 422 of the coil 421c.

Due to the fact that the present embodiment is structured in this manner, even if the contact point between the slide plate and leaf spring is moved due to change in loads and the direction of the force to be applied to the sensing element is changed to thereby cause deviations, the deviations act in a manner to cancel each other and, therefore, no detection error will be produced.

As has been described above, according to the eleventh embodiment of the invention, due to the fact that the sensing elements are respectively disposed adjacent to the two end portions of the inner surface of the slide plate and the sum of the detected values of the sensing elements provides the detection output of the sensing elements, even if the contact points between the slide plate and sensing elements are moved due to change in loads and the direction of the force to be applied to the sensing elements is changed to thereby cause deviations in the detected values, these deviations act in a direction to cancel each other and, therefore, no error will occur in the detection outputs.

Twelfth Embodiment

Figure 29:
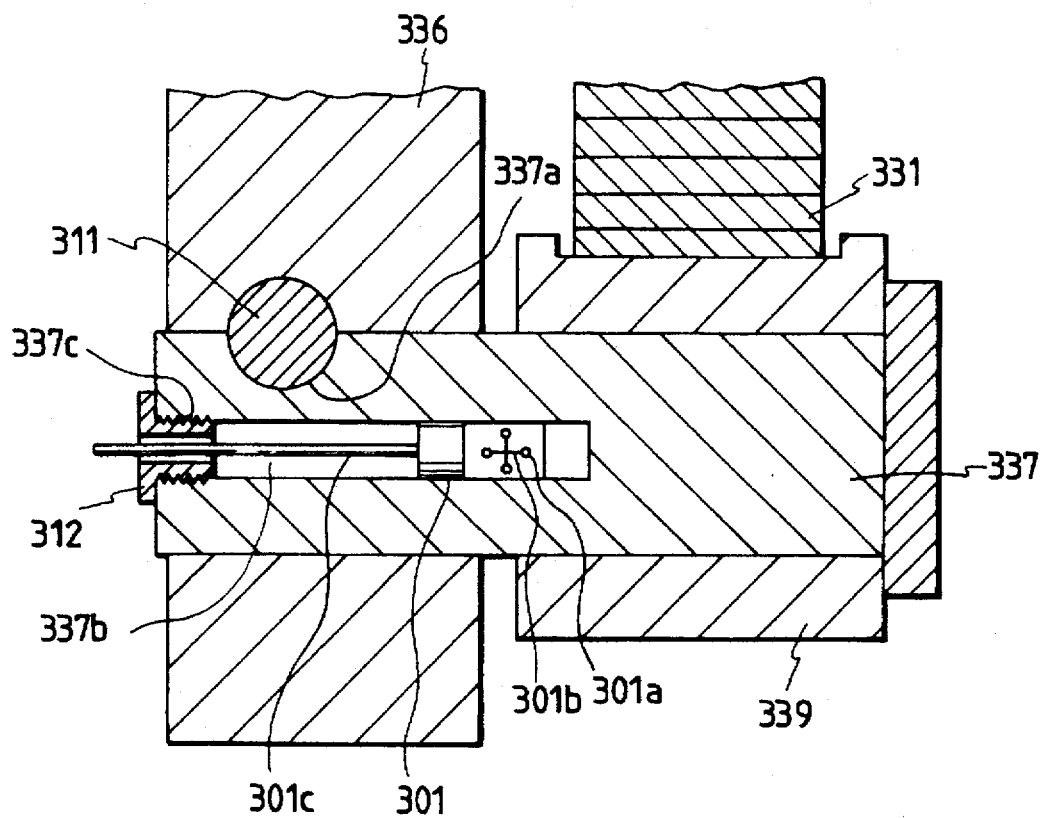
FIG. 29 is a section view of a twelfth embodiment of a vehicle load measuring apparatus according to the invention.

In FIG. 29, there is shown a section view of a twelfth embodiment of a vehicle load measuring apparatus according to the invention. As shown in FIG. 29, part of a cylindrical trunnion shaft 337 is fitted into a trunnion bracket 336 (see FIG. 23) fixed to the bed frame of a vehicle and a leaf spring 331 is mounted through a spring seat 339 to the other portion of the trunnion shaft 337 that is projecting externally from the trunnion bracket 336.

Also, there is formed a groove 337a on the surface of the trunnion shaft 337 in the vicinity of the end portion thereof and, by inserting a shaft fixing bolt 311 into the groove 337a from the side surface of the trunnion bracket 337a and then tightening the bolt 311, the trunnion shaft 337 is fixed to the trunnion bracket 336 in such a manner that it cannot be rotated.

Also, in the central portion of the trunnion shaft 337, as shown in FIG. 29, there is formed a hollow hole 337b which includes a screw groove 337c formed in the vicinity of the entrance thereof, and a magnetic strain type sensing element 301 is fitted into and mounted into the hole 337b. The magnetic strain type sensing element 301 is formed of a magnetic material such as permalloy, the two end portions of the sensing element 301 are respectively cylindrical in shape, the central portion thereof is formed in a plate-like shape, four small holes 301a are opened up in the plate-like central portion, and a coil 301b are wound through these four holes in an intersecting manner.

A lead wire 301c drawn out from the coil 301b is guided through the hole 337b of the trunnion shaft 337 and is drawn out externally from the hole 337b. And, since a mudguard stopper 312 can be threadedly engaged with the entrance of the hole 337 by use of the screw groove 337c, there is opened up in the stopper 312 a hole through which the lead wire 301c is passed.

Figure 30:
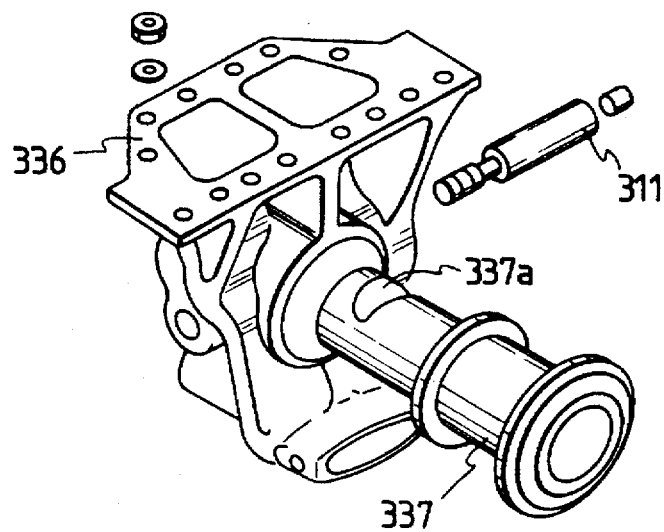
FIG. 30 is an exploded perspective view of the portion shown in FIG. 29.

Now, in FIG. 30, there is shown an exploded perspective view of the portion of the load measuring apparatus in which the sensing element 301 is disposed.

Since the present embodiment is structured in this manner, the load of the vehicle is applied through the trunnion bracket 336 onto the trunnion shaft 337 as a load F. As a result of this, a shearing force is applied to the trunnion shaft 337 and thus the sensing element 301 disposed within the trunnion shaft 337 is caused to strain to thereby change the output of the sensing element 301, so that the live load of the vehicle can be detected. Because the force to be detected is the shearing force, the detected value is free from influences caused by the inclination of the vehicle due to the inclined road and the like.

As described above, in the present embodiment, since the sensing element 1 is fitted into the trunnion shaft 337, when compared with the structure in which the sensing element is incorporated into the slide plate 338 (see FIG. 23), the characteristic thereof will not be changed due to wear and, even when the slide plate is replaced with a new one due to wear, it is not necessary to replace the sensing element 301, which results in the reduced cost. Also, when compared with a case in which sensing elements are incorporated into the slide plate 338, in the present embodiment, only two sensing elements 301 are used, which can reduce the cost accordingly.

Further, in the present embodiment, because the positioning groove 337a is formed on the surface of the trunnion shaft, if the loading direction to the sensing element 301 is previously adjusted at the time when the sensing element 301 is fitted into the hole 337a of the trunnion shaft 337, when fitting and fixing the trunnion shaft 337 to the trunnion bracket 336, the shaft fixing bolt 311 may be inserted into the groove 337a from the hole formed in the side surface of the trunnion bracket 336, whereby the trunnion shaft 337 can be unrotatably fixed to the trunnion bracket 336 and, therefore, the loading direction to the sensing element 301 can be always set to a given direction.

Thirteenth Embodiment

Next, description will be given below of a thirteenth embodiment of a vehicle load measuring apparatus according to the invention.

Figure 19:
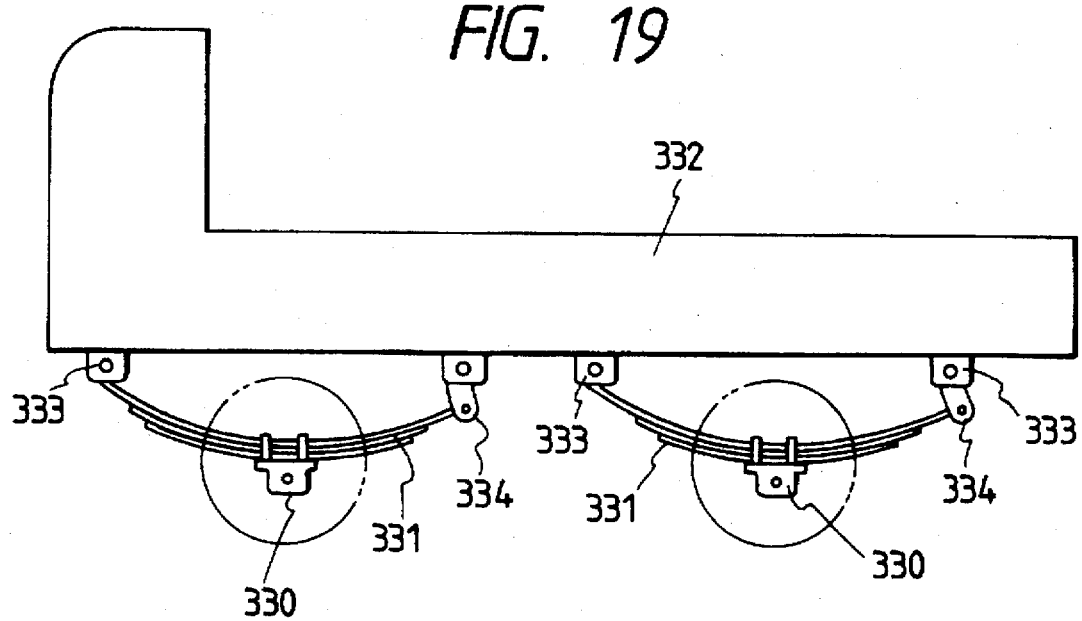
FIG. 19 is a side view of a vehicle using a shackle as a suspension part.
Figure 20:
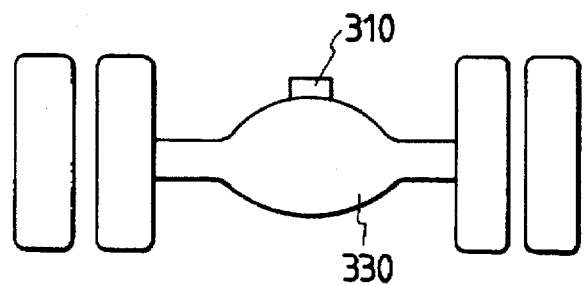
FIG. 20 is a view of an arrangement of a conventional load measuring sensor.
Figure 21:
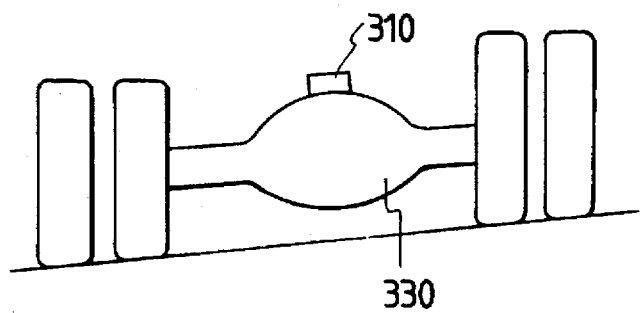
FIG. 21 is a view to explain inconveniences in measuring the vehicle load when the road is inclined.
Figure 31A:
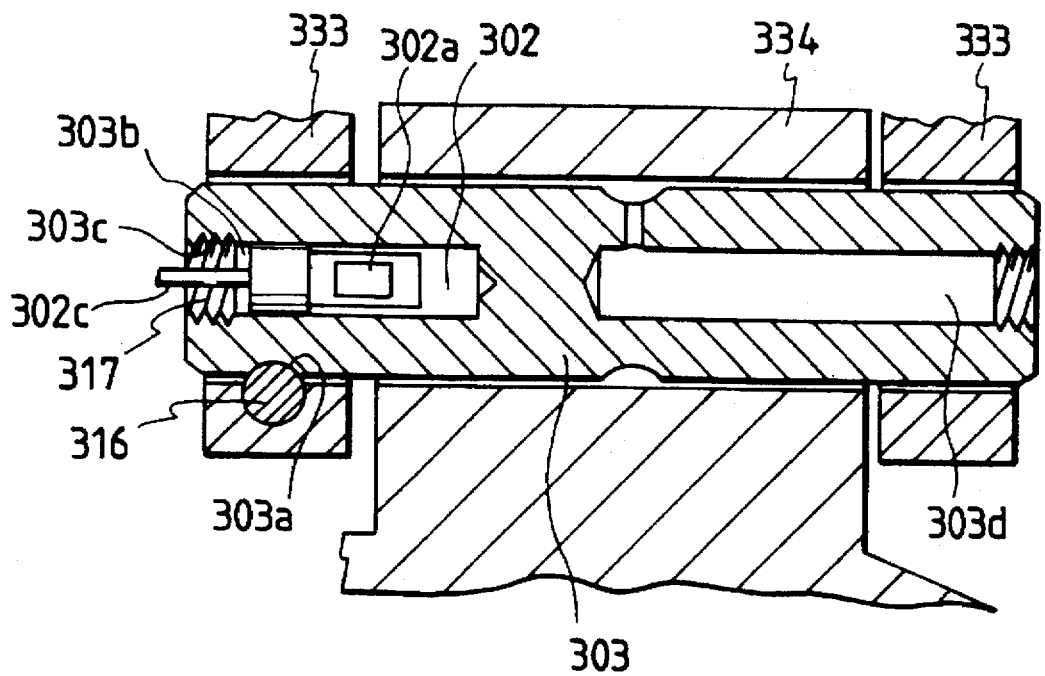
FIG. 31(a) is a section view of a thirteenth embodiment of a vehicle load measuring apparatus according to the invention.

In FIG. 31(a), there is shown a section view of the thirteenth embodiment of the invention. As shown in this figure, a cylindrical shackle pin 303 is fitted with a bracket 333 (see FIG. 19) fixed to the bed frame of the vehicle, and a shackle 334 is rotatably connected to the shackle pin 303. Also, there is formed a groove 303a on the surface of the shackle pin 303 in the vicinity of the end portion thereof. Thus, when connecting together the bracket 333 and shackle 334, if a fixing bolt 316 is inserted into the groove 303a from a hole formed in the side surface of the bracket 333 and is tightened, then the shackle pin 303 can be unrotatably fixed to the bracket 333.

Also, in the central portion of the shackle pin 303, as shown in FIG. 31(a), there is opened up a hollow hole 303b including a screw groove 303c adjacent to the entrance thereof, and a strain gauge type sensing element 302 is fitted into the hole 303b. The sensing element 302 is formed of a magnetic material and includes two cylindrical end portions and a plate-shaped central portion. To the central portion is bonded a resistance wire 302a which serves as a sensing part. A lead wire 302c that is drawn out from the resistance wire 302a is guided through the hole 303b of the shackle pin 303 and is then drawn out externally from the hole 303b. And, since a mudguard stopper 317 can be threadedly engaged with the entrance of the hole 303b by use of the screw groove 303c, in the stopper 317 there is formed a hole through which the lead wire 302c can be passed. Also, on the opposite side of the hole 303b of the shackle pin 303, there is formed another hole 303d which is used to supply grease.

Figure 13:
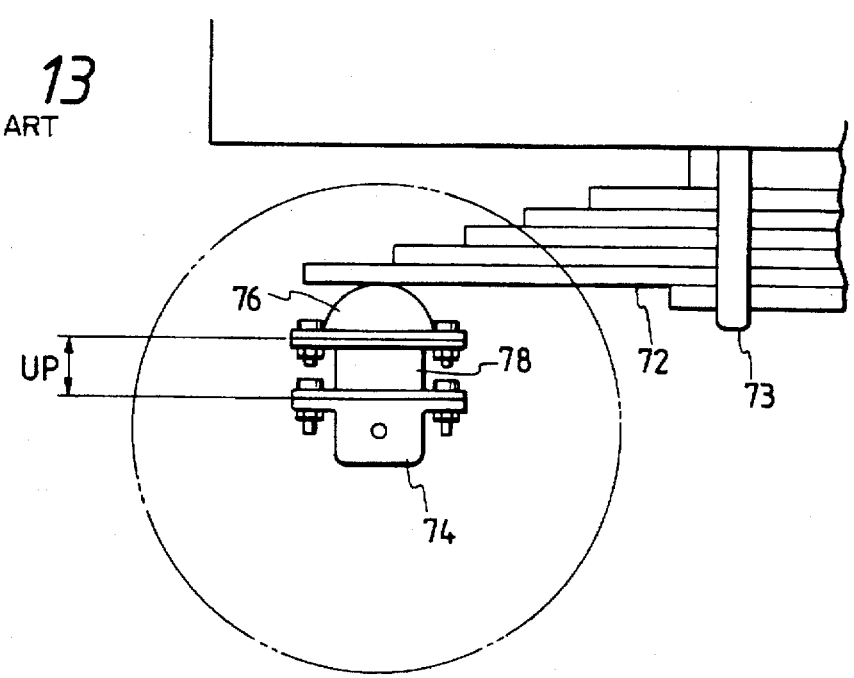
FIG. 13 is an enlarged view of a portion of FIG. 12.
Figure 14:
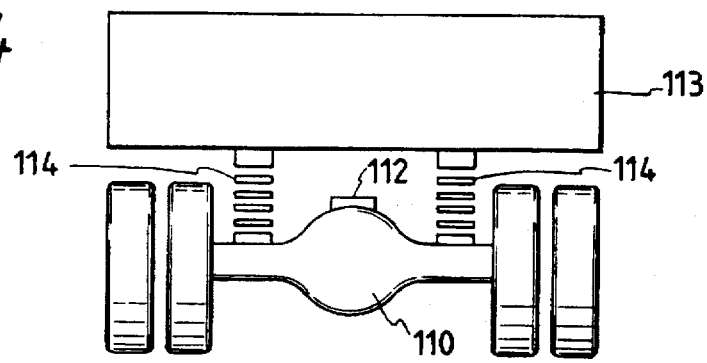
FIG. 14 is a view showing positions at which sensing elements of a conventional art load measuring device are disposed.
Figure 15A:
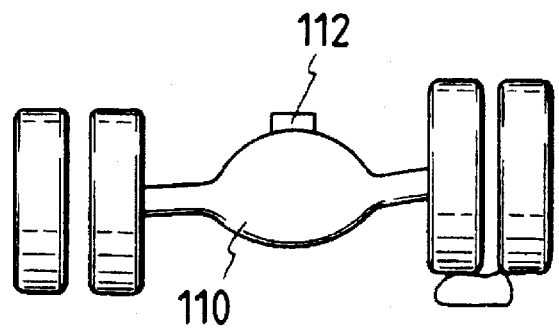
FIGS. 15(a), 15(b) and 15(c) are diagrams illustrating cases where the loadage is inaccurately measured.
Figure 15B:
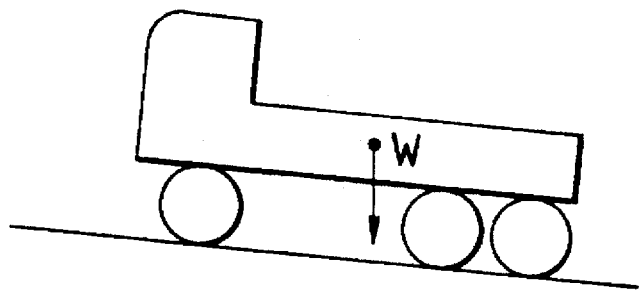
Figure 15C:
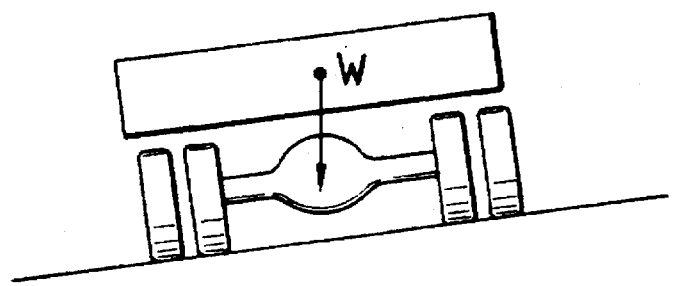
Figure 16:
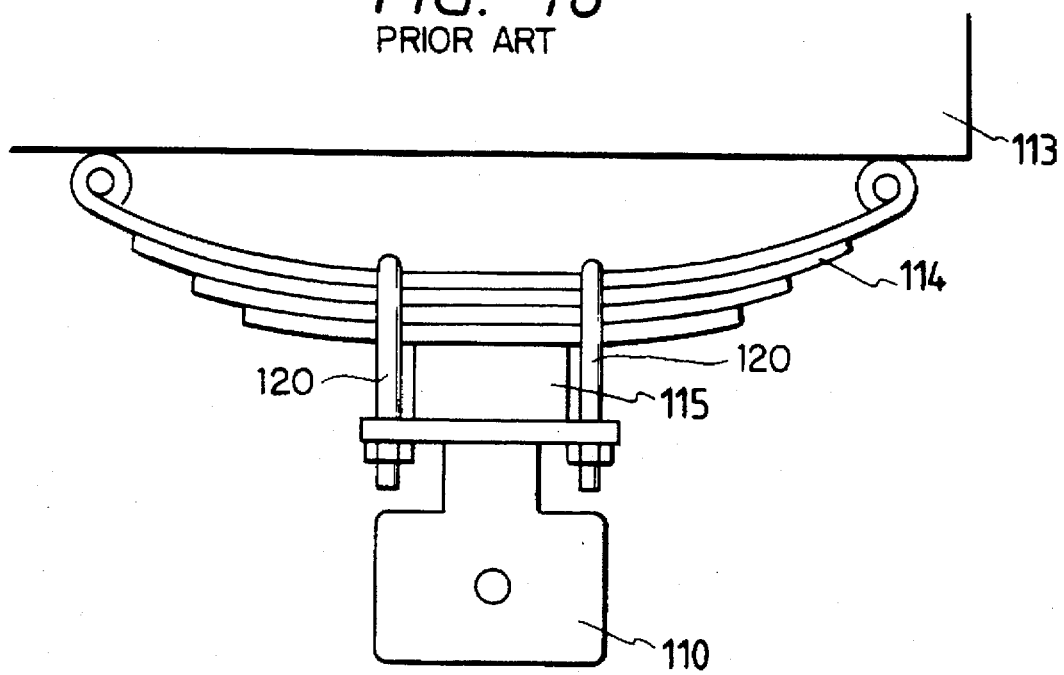
FIG. 16 is a view showing a position at which a sensing element of a conventional art load measuring device is disposed.
Figure 31B:
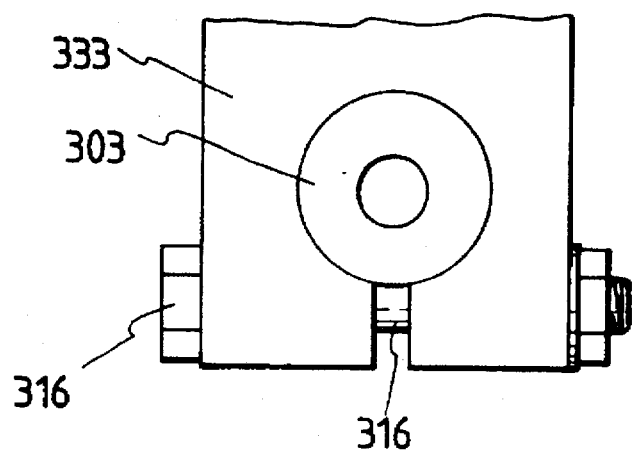
FIG. 31(b) is a side view of the thirteenth embodiment.
Figure 32:
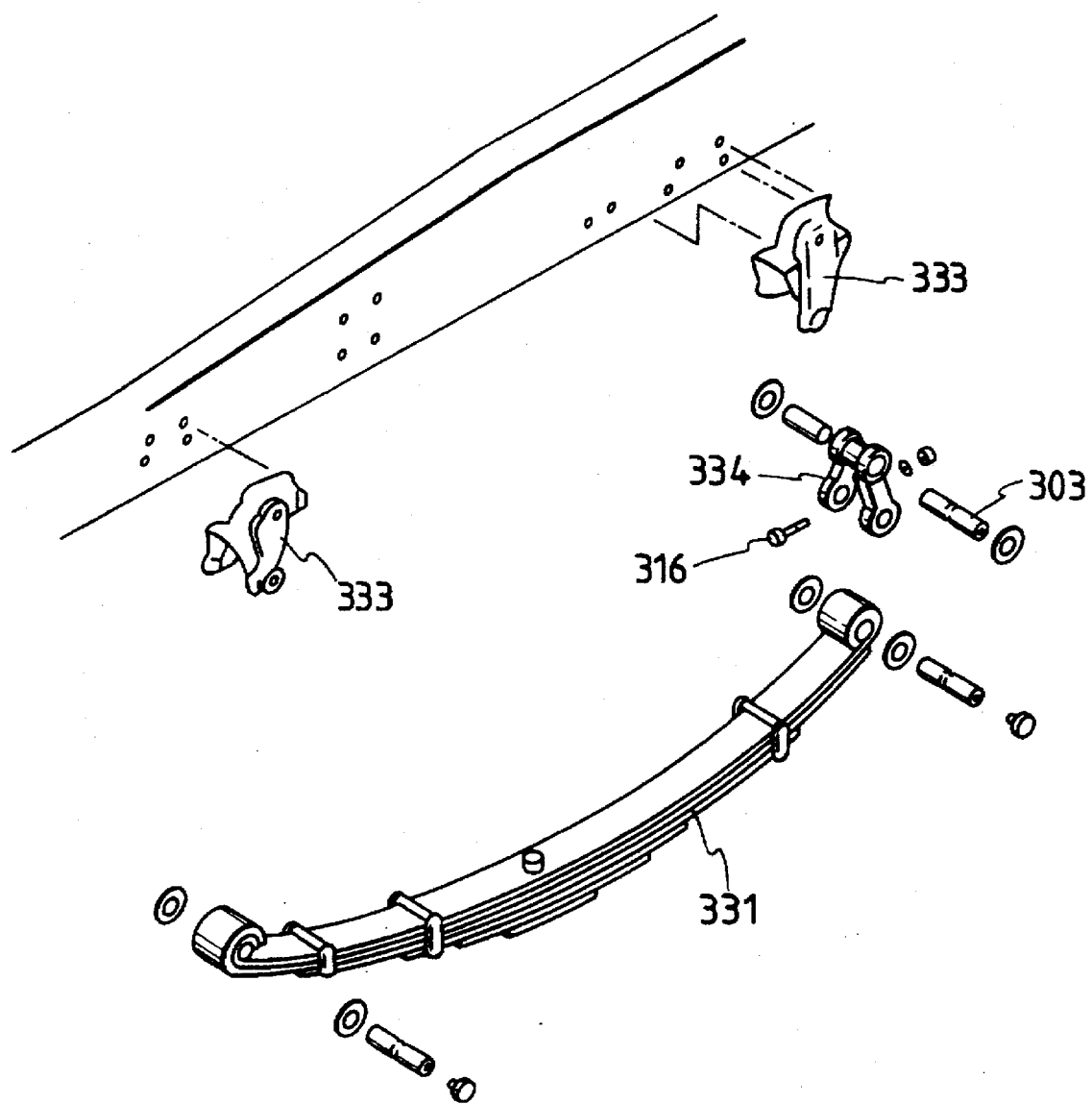
FIG. 32 is an exploded perspective view of a structure for supporting a leaf spring on the bed frame of a vehicle.

Now, FIG. 31(b) is a side view of the part shown in FIG. 31(a) and FIG. 32 is an exploded perspective view of a structure for supporting a leaf spring 331 by a bed frame 332. In both of them, the same parts as those used in FIGS. 1 and 13(a) are given the same reference characters and thus the description thereof is omitted here.

Since the present embodiment is structured in the above-mentioned manner, the load of the vehicle is applied through the bracket 333 onto the shackle pin 303 as a load F. This applies a shearing force to the shackle pin 303 and thus the sensing element 302 disposed in the shackle pin 303 is strained to change the sensing output, so that the live load of the vehicle can be detected.

Figure 22:
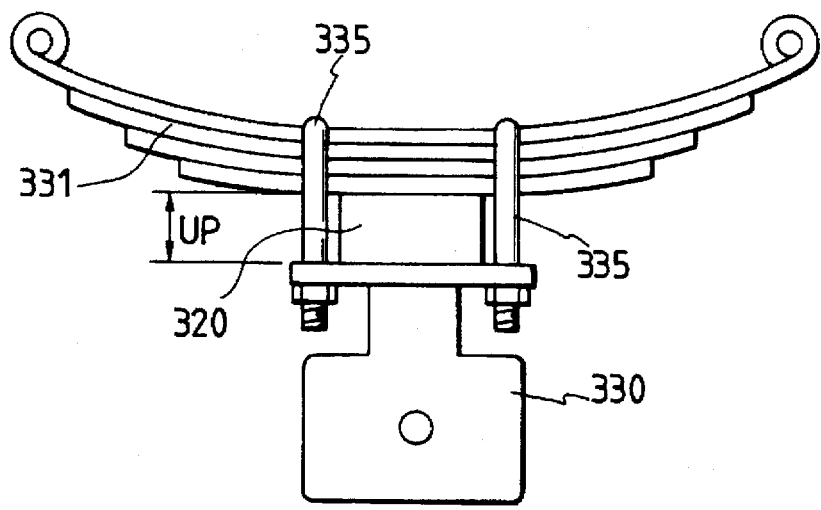
FIG. 22 is a view of an arrangement of a conventional load measuring sensor.

As mentioned above, due to the fact that the sensing element 302 is fitted into the shackle pin 303, there is eliminated the problem that a high mounting cost is required as in the conventional sensor arrangement shown in FIG. 22. Also, there is eliminated the problem that the height of the vehicle bed is increased by an amount corresponding to the sensor to worsen operationability in the loading operation, to lower an operation efficiency and to increase the burden of an operator.

Further, due to use of the shackle pin 303 which is an existing part, it is easy to add newly a load measuring apparatus. And, since the shackle pin 303 conventionally includes a grease supply hole in one portion thereof, even if there is additionally formed in the other portion thereof a hole for the sensing element 302 which is smaller in diameter than the grease supply hole, no problem will arise with respect to the strength of the shackle pin.

Moreover, due to the fact that the positioning groove 303a is formed in the surface of the shackle pin 303, if the loading direction to the sensing element 302 is previously adjusted at the time when the sensing element 302 is fitted into the hole 303b in the shackle pin 303, then in fitting and fixing the shackle pint 303 to the bracket 333 the shaft fixing bolt 316 may be inserted through the groove 303a from the hole in the side surface of the bracket 333 and then be tightened, so that the shackle pin 303 can be unrotatably fixed to the bracket 333 and thus the loading direction to the sensing element 302 can be set to a given direction.

In the twelfth and thirteenth embodiments, in one case a magnetic strain type sensing element is used, and in the other case a strain gauge type sensing element is used. However, this is not limitative but a piezoelectric type sensing element can also be used. Also, a main body used as a measuring apparatus is the same as a conventional one and thus the illustration and description thereof are omitted in this specification.

As has been described above, the vehicle load measuring apparatus according to the twelfth and thirteenth embodiments of the invention provide effects that they do not increase the height of the vehicle, do not change the characteristics thereof due to the worn vehicle parts, and do not require the simultaneous replacement of the sensing element when the other vehicle parts are replaced.

What is claimed is:

1. A vehicle load measuring device comprising:

a sensing element for detecting a strain at a position where said sensing element is located on a vehicle to measure the load of the vehicle, said sensing element being formed in a pin shape; and a trunnion shaft for supporting a suspension of the vehicle, a hole being formed in the central portion thereof and said sensing element being fitted into said hole, and a positioning groove being formed on a surface of said trunnion shaft, wherein when said trunnion shaft is mounted to a trunnion bracket said trunnion shaft is positioned by use of said positioning groove, thereby determining the direction of the load of the vehicle to be applied to said sensing element and preventing said trunnion shaft from rotating with respect to said trunnion bracket.

2. A vehicle load measuring apparatus as claimed in claim 1, wherein said trunnion shaft is positioned by use of said positioning groove in which a shaft fixing bolt is disposed in said positioning groove thereby fixing said trunnion shaft to said trunnion bracket and fixing the orientation of said trunnion shaft with respect to said trunnion bracket.

3. A vehicle load measuring apparatus as claimed in claim 1, wherein said sensing element is comprised of a magnetic strain sensing element formed from a magnetic material in a plate-like shape having a plurality of holes and having a coil wound in an intersecting manner through said plurality of holes.

4. A vehicle load measuring apparatus as claimed in claim 3, wherein said sensing element includes only one magnetic strain sensing element.

5. A vehicle load measuring apparatus comprising:

a sensing element for detecting a strain at a position where said sensing element is located on a vehicle to measure the load of the vehicle, said sensing element being formed in a pin shape; and a shackle pin for connecting a shackle, for supporting a suspension of the vehicle, with a bracket mounted on a load frame of the vehicle, a hole being formed in the central portion of said shackle pin, and said sensing element being fitted into said hole, and a positioning groove being formed on a surface of said shackle pin, wherein when said shackle pin connects said shackle with said bracket on the load frame said shackle pin is positioned by use of the positioning groove, thereby determining the direction of the load to be applied to said sensing element and preventing said shackle pin from rotating with respect to said bracket.

6. A vehicle load measuring apparatus as claimed in claim 5, wherein said shackle pin is positioned by use of said positioning groove in which a shaft fixing bolt is disposed in said positioning groove thereby fixing said shackle pin to said bracket and fixing the orientation of said shackle pin with respect to said bracket.

7. A vehicle load measuring apparatus s claimed 5, wherein said sensing element is comprised of a magnetic strain sensing element formed from a magnetic material in a plate-like shape a plurality of holes and having a coil wound in an intersecting manner through said plurality of holes.

8. A vehicle load measuring apparatus as claimed in claim 7, wherein said sensing element includes only one magnetic strain sensing element.

9. A vehicle load measuring device comprising:

a sensing element for detecting a strain to measure the load of a vehicle, said sensing element being formed in a pin shape; and means for supporting a suspension of the vehicle, a hole being formed in said supporting means and said sensing element being fitted into said hole, wherein the load of the vehicle is measured based on the strain detected by said sensing element produced in response to the load supported by said supporting means, and a positioning groove being formed on a surface of said means for supporting a suspension, wherein when said means for supporting a suspension connects a suspension with a bracket on the vehicle said means for supporting a suspension is positioned by use of the positioning groove, thereby determining the direction of the load to be applied to said sensing element and preventing said means for supporting a suspension from moving in a predetermined direction with respect to said bracket.

10. A vehicle load measuring apparatus as claimed in claim 9, wherein said sensing element is comprised of a magnetic strain sensing element formed from a magnetic material in a plate-like shape having a plurality of holes and having a coil wound in an intersecting manner through said plurality of holes.

* * * * *